United States Patent
Iguchi et al.

(10) Patent No.: US 7,242,800 B2
(45) Date of Patent: Jul. 10, 2007

(54) IMAGE PROCESSING APPARATUS, IMAGE PROCESSING SYSTEM, IMAGE PROCESSING METHOD, STORAGE MEDIUM, AND PROGRAM

(75) Inventors: Ryosuke Iguchi, Kanagawa (JP); Makoto Torigoe, Tokyo (JP); Shigeru Mizoguchi, Kanagawa (JP); Yuji Akiyama, Kanagawa (JP); Manabu Yamazoe, Tokyo (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/386,606

(22) Filed: Mar. 13, 2003

(65) Prior Publication Data

US 2003/0174886 A1    Sep. 18, 2003

(30) Foreign Application Priority Data

Mar. 15, 2002  (JP)  ............................. 2002-072164

(51) Int. Cl.
*G06K 9/00* (2006.01)
(52) U.S. Cl. ........................ 382/167; 382/162; 382/166
(58) Field of Classification Search ................ 382/162, 382/166, 167, 168, 294, 274, 314, 108; 348/223.1, 348/362; 358/1.9, 518, 522, 530; 355/67, 355/71, 69, 32
See application file for complete search history.

(56) References Cited

U.S. PATENT DOCUMENTS

| | | | |
|---|---|---|---|
| 5,877,846 A  * | 3/1999 | Tahara et al. .................. 355/67 |
| 6,608,926 B1 | 8/2003 | Suwa et al. .................. 382/162 |
| 6,628,825 B1 | 9/2003 | Yamazoe et al. ........... 382/167 |
| 6,628,830 B1 * | 9/2003 | Yamazoe et al. ........... 382/168 |
| 6,694,051 B1 | 2/2004 | Yamazoe et al. ........... 382/167 |
| 6,739,767 B2 * | 5/2004 | Ikeda et al. .................. 396/567 |
| 6,801,296 B2 * | 10/2004 | Ikeda et al. ................... 355/38 |
| 6,862,040 B1 * | 3/2005 | Sawachi .................. 348/231.3 |
| 2003/0076420 A1 | 4/2003 | Akiyama et al. ......... 348/207.1 |
| 2003/0174216 A1 | 9/2003 | Iguchi et al. ............. 348/223.1 |

FOREIGN PATENT DOCUMENTS

JP          11-331565         11/1999

* cited by examiner

*Primary Examiner*—Anh Hong Do
(74) *Attorney, Agent, or Firm*—Fitzpatrick, Cella, Harper & Scinto

(57) ABSTRACT

In an image processing apparatus which can always provide an excellent processed image, an analysis unit analyzes condition information representing a condition at a time when an image is obtained and being included in image information, and determines an algorithm of an image correction process for the image based on the analyzed result.

20 Claims, 16 Drawing Sheets

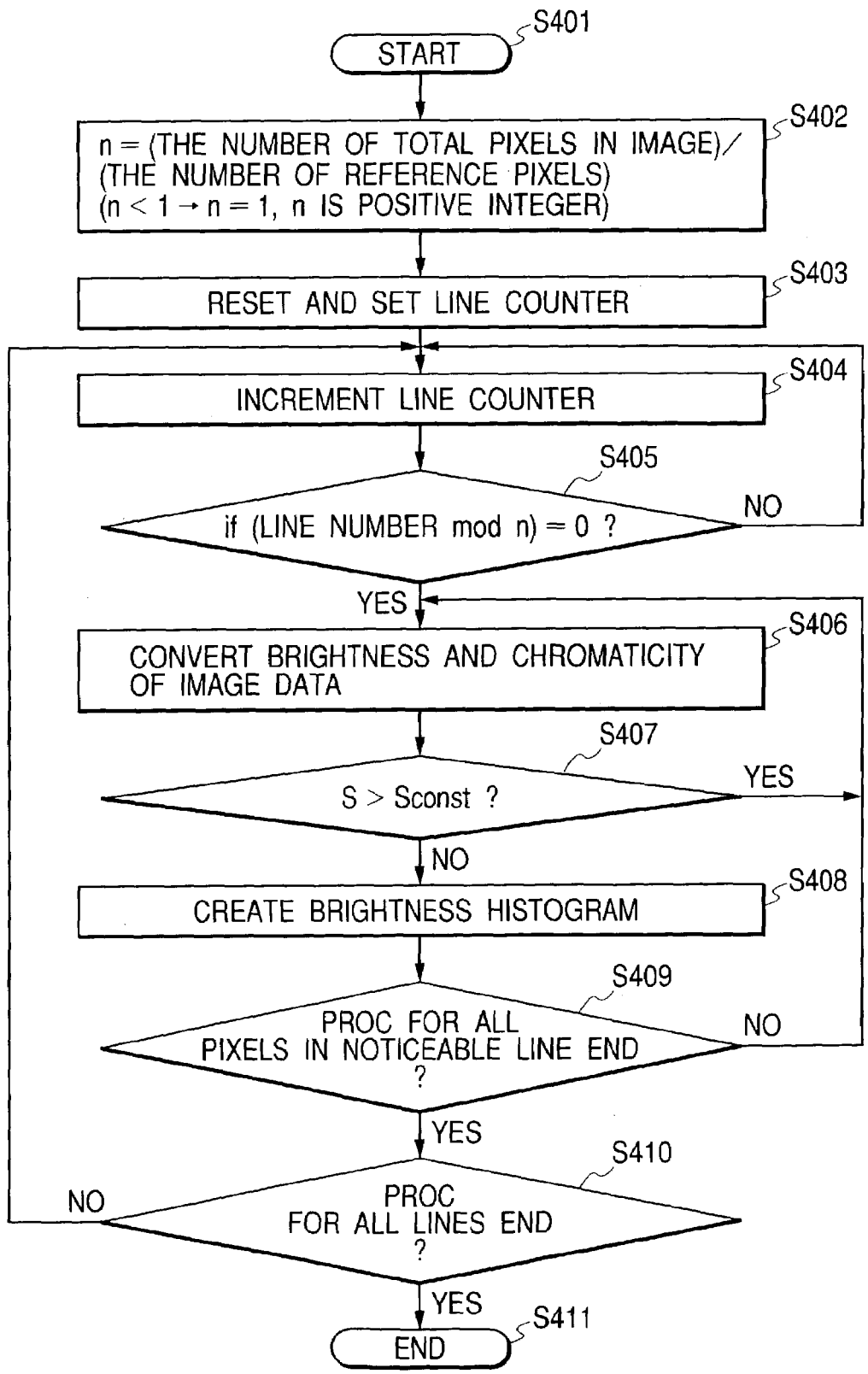

FIG. 13

| HLP | BALANCE OF HISTOGRAM (S128) | SDP | CORRECTION GRADATION CURVE |
|---|---|---|---|
| —200 | 0—60 | 0—10 | CUT OFF HIGH BRIGHTNESS AREA ≧ 230 |
| | | 11—30 | S-CURVE |
| | | 31— | CURVE OF $\gamma = 0.7$ |
| | 61—100 | 0—50 | S-CURVE |
| | | 51— | CUT OFF LOW BRIGHTNESS AREA ≦ 50, AND MULTIPLY $\gamma = 0.9$ |
| 201—230 | 0—30 | 0—40 | CUT OFF HIGH BRIGHTNESS AREA ≧ 240 |
| | | 41— | CURVE OF $\gamma = 0.8$ |
| | 31—60 | 0—5 | CURVE OF $\gamma = 1.2$ |
| | | 6—20 | S-CURVE |
| | | 21— | CUT OFF LOW BRIGHTNESS AREA ≦ 20, AND MULTIPLY $\gamma = 0.9$ |
| | 61—100 | 0—50 | CURVE OF $\gamma = 0.8$ |
| | | 51— | S-CURVE |
| 231—255 | 0—15 | 0—30 | CUT OFF HIGH BRIGHTNESS AREA ≧ 230 |
| | | 31—50 | CURVE OF $\gamma = 0.8$ |
| | | 51— | CUT OFF LOW BRIGHTNESS AREA ≦ 50, AND MULTIPLY $\gamma = 0.9$ |
| | 16—50 | 0—8 | CUT OFF HIGH BRIGHTNESS AREA ≧ 230 |
| | | 9—20 | S-CURVE |
| | | 21— | CURVE OF $\gamma = 1.1$ |
| | 51—100 | 0—10 | CURVE OF $\gamma = 1.2$ |
| | | 11— | CURVE OF $\gamma = 0.9$ |

IMAGE PROCESSING APPARATUS, IMAGE PROCESSING SYSTEM, IMAGE PROCESSING METHOD, STORAGE MEDIUM, AND PROGRAM

BACKGROUND OF THE INVENTION

1. Field of the Invention

The present invention relates to an image processing apparatus, an image processing system and an image processing method which are all used in an apparatus or a system which performs an image correction process to print and output by a printer digital image data shot and obtained by, e.g., a digital still camera or the like, to a computer-readable storage medium which stores a program for executing the image processing method, and to the program itself.

2. Related Background Art

In recent years, for example, a digital still camera is popularized, whereby an image shot by the digital still camera can be easily digitized. In particular, a chance of handling and treating a photographic image (i.e., an image seen like a photograph) as digital image data increases on a personal computer. Moreover, by using various application programs (software) on the personal computer, the digital image data representing the photographic image can be easily processed and edited.

On one hand, a full-color hard copy technique rapidly develops. Particularly, in a print technique based on an ink-jet print system, a technique to reduce graininess of ink dots improves, whereby an image quality of the print output in this print technique becomes equivalent to an image quality of a silver-salt photograph. Furthermore, this print technique is widely used because it is relatively simple.

According to such a technical background as described above, it is required enabling to easily print the digital image data shot and obtained by the digital still camera. Furthermore, in regard to an image correction process to be performed in case of printing and outputting the image data, the need for an automatic image correction process in which an excellent image-corrected image can be obtained by using the application programs on the personal computer increases instead of a manual image correction process in which complicated functions are used.

Consequently, as a method of performing image processes such as the image correction process and the like in case of printing and outputting the image data so as to obtain an excellent output result, for example, a method of analyzing a scene of the shot image and then automatically performing the image correction based on the analyzed result, and other various methods are proposed.

Furthermore, for example, a method of performing so-called "density correction" which is the correction to prevent that the shot image is too bright (too thin) or too dark (too thick) when this image is printed and output is proposed. Moreover, a method of performing so-called "image correction" which is the correction to correct an inappropriate shot image including color fog, underexposure (defective lightness and/or contrast), defective saturation or the like and an image with the color balance being defective due to color fog or the like is proposed.

As a structure to perform the automatic image correction in both the method of performing "density correction" and the method of performing "image correction", a structure which analyzes the image to be processed (also called an original image or a process-target image hereinafter) by using a histogram on which the numbers of pixels of each brightness value of a brightness signal in the original image have been accumulated and then corrects the original image on the basis of the analyzed result is applied.

Furthermore, the digital still camera side has a function to be able not only to record the shot and obtained image as the digital image data in a storage medium such as a memory card or the like but also to record additional information representing a shooting condition at a time of image shooting together with the digital image data in the storage medium.

Here, it is assumed that the process-target image is shot by the digital still camera, the shot and thus obtained process-target image is analyzed, the scene of the analyzed process-target image is further analyzed, and the automatic image correction of the process-target image is performed on the basis of the analyzed result. In this case, basically, the automatic image correction is performed so that the images which are thought to be logically optimum (i.e., standard images) are printed and output respectively for all of the process-target images.

Incidentally, in such a color correction and a lightness correction, it is often the case that the image process is statistically performed by using the histogram of the image, that is, the optimum correction in all the images cannot necessarily be performed on the basis of the analysis of only the image data. In other words, more precise and strict judgment can be performed if white balance information and exposure information are used respectively for the color correction and the lightness correction.

Furthermore, unlike the manual image correction that a user manually corrects the process-target image by using the application program on the personal computer while confirming it displayed on the monitor of this computer, there is the fear in the automatic image correction that the correction to obtain a standard image is performed against user's intention at the time when obtaining the process-target image (i.e., at the time of shooting the process-target image).

For example, even if the user intentionally sets a manual mode and then shoots an image under an exposure condition to lighten or darken the image, the obtained light image is corrected to make it rather darker and the obtained dark image is corrected to make it rather lighter. That is, in this case, the image obtained in the manual mode is output as an image having appropriate lightness against user's intention. In other words, any process-target image is corrected and output as the image having the same lightness.

Furthermore, even if the user intentionally changes a white balance of the digital still camera to aim at a specific effect and then shoots an image based on the changed white balance, the shot image obtained is corrected to have an optimum color balance (i.e., not the changed white balance).

On one hand, it is assumed that plural image processes such as an exposure correction process, a color balance correction process, an image optimizing process based on the shot scene information, and the like are performed. In such a case, if each process is independently performed, there is a possibility that similar processes are performed redundantly, and there is a possibility that the point which should be emphasized becomes weak through the succedent processes. That is, when the plural processes are performed, it is necessary to eliminate that the similar processes are performed redundantly, and it is also necessary to take account which process should be emphasized and which process should be de-emphasized.

Similarly, as the function of the digital still camera improves in recent years, for example, there is a camera which has a special effect function to increase the saturation of the shot (obtained) image, make the contrast or lightness of the shot (obtained) image variable, or the like. In the camera of such a type, if the special effect function is used as well as the image correction process, the double correction is resultingly performed, whereby the obtained special effect is diminishingly or emphasized too much. Thus, in this case, there is the fear that the image which has been subjected to the image correction process deteriorates.

SUMMARY OF THE INVENTION

The present invention is made in order to solve such a drawback as above, and an object thereof is to provide an image processing apparatus, an image processing system and an image processing method which all can provide an excellent processed image, a computer-readable storage medium which stores a program for executing the image processing method, and the program itself.

In order to achieve the above object, the first invention is characterized by providing an image processing apparatus which performs an image process to image information including condition information representing a condition at a time when an image is obtained, and comprises: an analysis means for analyzing the condition information; and a processing determination means for obtaining a lightness correction amount of the image according to a value representing a level of lightness, a color correction amount of the image according to a value representing a level of color balance and a smoothing correction amount of the image according to a value concerning zoom, on the basis of an analysis result of the analysis means.

Furthermore, the second invention is characterized by, in a case where plural kinds of image information are obtained and then plural processes respectively corresponding to the obtained plural kinds of image information are performed, setting order of priority for the plural processes.

Other features of the present invention will be apparent from the following description taken in conjunction with the accompanying drawings.

BRIEF DESCRIPTION OF THE DRAWINGS

FIG. 4 is a flow chart showing a procedure to create a brightness histogram;

FIG. 5A shows an ideal color solid, and FIG. 5B shows a color solid before an image in question is not yet subjected to the color balance correction;

FIG. 7A shows a concept of overexposure, FIG. 7B shows a concept of underexposure, FIG. 7C shows an example of overexposure, and FIG. 7D shows an example of underexposure;

FIG. 13 is a diagram showing contents of a table used in the gradation curve judgment process and for explaining how to determine a gradation curve according to a kind of image;

DETAILED DESCRIPTION OF THE PREFERRED EMBODIMENTS

Hereinafter, the embodiment of the present invention will be described with reference to the accompanying drawings.

Figure 1:
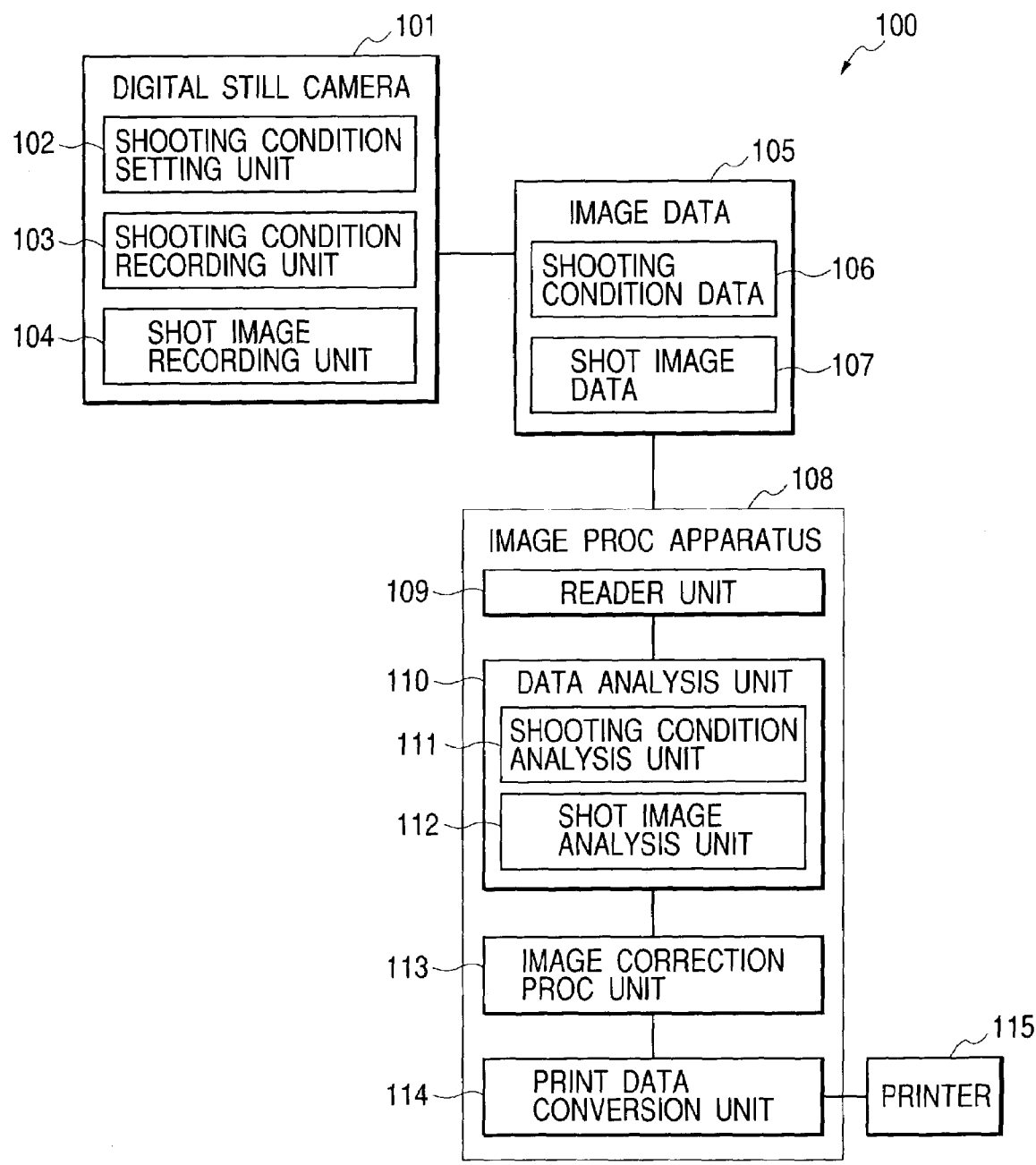
FIG. 1 is a block diagram showing the structure of an image print system to which the first embodiment of the present invention is applied.

The embodiment is applied to, e.g., an image print system 100 as shown in FIG. 1.

In the image print system 100 according to the present embodiment, particularly, information (additional information) representing a shooting condition and added to process-target image data obtained by shooting a process-target image with a digital still camera 101 is first analyzed, and image correction of the process-target image data is automatically performed on the basis of the analyzed result, whereby a high-quality photographic image print result in which user's intention at the time when obtaining the process-target image data is sufficiently reflected can be provided.

Hereinafter, the structure and operation of the image print system 100 according to the embodiment will be explained concretely.

(Structure of Image Print System 100)

As shown in FIG. 1, the image print system 100 includes the digital still camera 101, an image processing apparatus 108 and a printer 115.

The digital still camera 101 obtains shot image data 107 through a shooting operation, and then outputs to the image processing apparatus 108 image data 105 including shooting condition data (additional information) 106 in the shooting operation and the shot image data 107. To that end, the digital still camera 101 includes a shooting condition setting unit 102, a shooting condition recording unit 103 and a shot image recording unit 104.

The shooting condition setting unit 102 sets various shooting conditions necessary for the shooting operation.

The shooting condition recording unit 103 records the shooting condition data 106 set by the shooting condition setting unit 102, in the image data 105 (i.e., the data to be output to the image processing apparatus 108).

The shot image recording unit 104 records the shot image data 107 obtained by the shooting operation according to the shooting condition set by the shooting condition setting unit 102, in the image data 105.

Here, as a method of supplying the image data 105 to the image processing apparatus 108, it is possible to adopt a data transfer method using a communication line, a method of recording the data in an arbitrary recording medium or storage medium, or the like.

The image processing apparatus 108 which consists of, e.g., a personal computer activates a predetermined application program to perform the image correction process to the shot image data 107 of the image data 105 sent from the digital still camera 101, and cause the printer 115 to print and output the processed data.

Consequently, the image processing apparatus 108 is equipped with a reader unit 109, a data analysis unit 110 including a shooting condition analysis unit 111 and a shot image analysis unit 112, an image correction processing unit 113, and a print data conversion unit 114. Here, it should be noted that the function of each of the above structural components 109 to 114 is achieved by activating the predetermined application program.

The reader unit 109 reads the image data 105 from the digital still camera 101.

The data analysis unit 110 causes the shooting condition analysis unit 111 to analyze the shooting condition data 106 included in the image data 105 obtained by the reader unit 109, and also causes the shot image analysis unit 113 to analyze the shot image data 107 included in the image data 105 obtained by the reader unit 109. Then, the data analysis unit 110 selects an image correction algorithm based on the analyzed results.

The image correction processing unit 113 performs the image correction process to the shot image data 107 according to the image correction algorithm selected by the data analysis unit 110.

More specifically, for example, in a case where the shot image analysis unit 112 analyzes a brightness value and a brightness distribution on the basis of the signal value of the shot image data 107, the characteristic of the shot image data 107 is first recognized based on the analyzed result, an optimum correction condition corresponding to the analyzed result is determined, and the image correction algorithm based on the determined condition is then selected.

That is, the image correction algorithm is finally determined in accordance with the algorithm determined based on the analyzed result of the shooting condition data 106 by the shooting condition analysis unit 111 and the algorithm determined based on the characteristic recognition of the shot image data 107 by the shot image analysis unit 112.

Here, it should be noted that the image correction process includes a lightness correction process, a contrast correction process, a color (color balance) correction process, a saturation correction process, a smoothing process, a contour emphasis process, a noise reduction process, and the like.

The print data conversion unit 114 converts the shot image data 107 corrected by the image correction processing unit 113, into data (e.g., C (cyan), M (magenta), Y (yellow) and K (black) data) having an appropriate form capable of being printed by the printer 115. Then, the print data conversion unit 114 transfers the converted data to the printer 115 through a predetermined interface.

Therefore, the printer 115 prints and outputs the data transferred from the print data conversion unit 114 of the image processing apparatus 108.

Here, it should be noted that, for example, a serial-scan ink-jet printer, an electrophotographic printer, a sublimation printer or the like is applicable as the printer 115.

In the present embodiment, the functions of the structural components 109 to 114 included in the image processing apparatus 108 are achieved by activating the predetermined application program running on the personal computer. However, the present invention is not limited to this. For example, these functions may be achieved by hardware, and more specifically, these functions may be achieved a driver of the printer 115.

Furthermore, for example, in a case where a personal computer is used as the image processing apparatus 108, the image data 105 may be stored in a storage medium such as a hard disk or the like of the image processing apparatus 108 or in a storage medium of another personal computer (including a server or the like) connected to the image processing apparatus 108 so that the stored image data 105 can be processed in the image forming apparatus 108.

Moreover, as described above, the method of using the arbitrary communication line, the recording medium or the storage medium can be applied to transfer the image data 105 from the digital still camera 101 to the image processing apparatus 108 (the storage medium or the like in the personal computer if the personal computer is used as the image processing apparatus 108). In addition, for example, a card reader, cable connection, infrared data communication or wireless communication may be applied to transfer the image data 105. In this case, for example, the digital still camera 101 may be connected to the image processing apparatus 108 through the cable connection, the infrared data communication or the wireless communication so that the image processing apparatus 108 directly reads the image data 105 from the a memory card, an internal memory or the like of the digital still camera 101.

Moreover, in the image print system 100, for example, the function of the image processing apparatus 108 may be provided in the printer 115. In this case, it is unnecessary to use the personal computer or the like as the image processing apparatus 108. Also, in this case, for example, the image data 105 may be read by the data reading means (corresponding to the function of the reader unit 109) such as the card reader or the like provided in the printer 115 through the recording medium or the storage medium such as the memory card or the like. Alternatively, the digital still camera 101 may be connected to the printer 115 through a cable, infrared data communication or wireless communication so that the printer 115 directly reads the image data 105 from the memory card, the internal memory or the like in the digital still camera 101.

Figure 2:
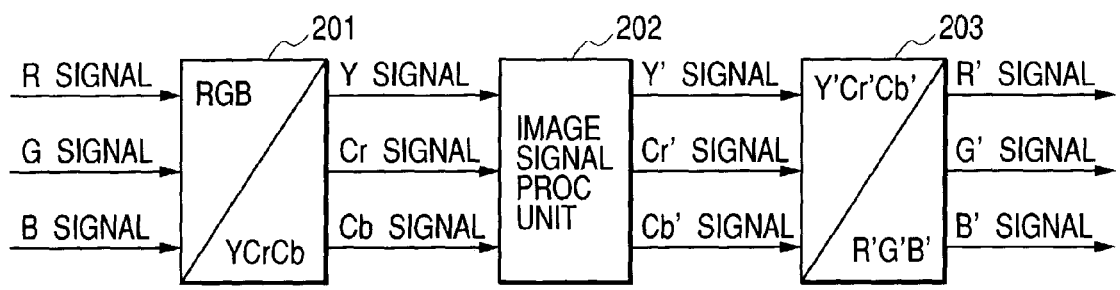
FIG. 2 is a diagram for explaining a case where R (red), G (green) and B (blue) image signals are once converted into Y (brightness), Cr (red color difference) and Cb (blue color difference) signals, the converted Y, Cr and Cb signals are subjected to an image process, and then the processed signals are again converted into R', G' and B' signals.

FIG. 2 shows a flow chart of a process to convert the R, G and B image signals into Lab signals (i.e., image signals in an Lab color space) suitable for the image correction process. That is, after the image correction process is performed by an image signal processing unit 202, L'a'b' signals are again returned to R', G' and B' image signals, whereby the image signals can be effective corrected. On one hand, it should be noted that simple Y, Cb and Cr signals may be used instead of the Lab signals, and the Y, Cb and Cr signals are used in the embodiment. Incidentally, in FIG. 2, numeral 201 denotes an RGB/YCrCb conversion unit, numeral 202 denotes the image signal processing unit, and numeral 203 denotes a Y'Cr'Cb'/R'G'B' conversion unit.

Next, the process by the image correction processing unit 113 will be explained. First, the information concerning the white balance is read from the shooting condition data 106, and the color balance correction (color correction) process is performed if the read information is obtained in the automatic shooting (auto mode).

On one hand, the information concerning the exposure is read from the shooting condition data 106, and the lightness correction (print density correction) process is performed if the read information is obtained in the automatic shooting (auto mode).

Furthermore, the information concerning digital zoom is read in the shooting condition data 106, and the image is subjected to a smoothing correction process if the digital zoom has been executed (ON).

(Color Balance Correction)

(First Processing Method)

First, the contents of the process in the color balance correction will be explained with reference to FIGS. 3 to 10.

Figure 3:
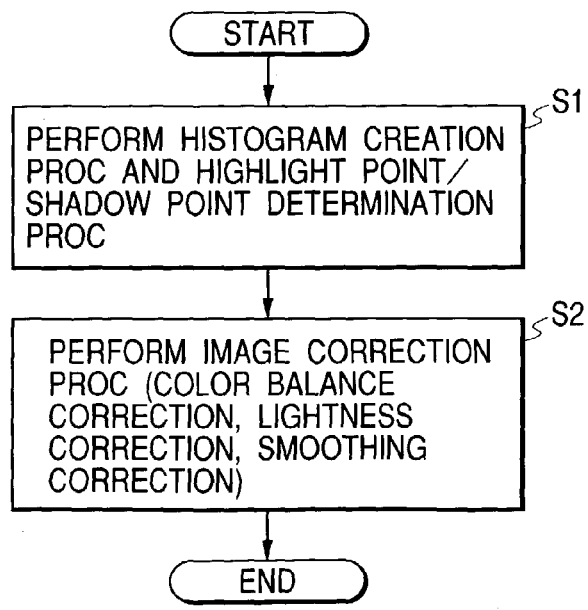
FIG. 3 is a flow chart showing a processing procedure of an image correction processing unit.

As shown in FIG. 3, the image correction processing unit 113 in the present embodiment performs a histogram creation process (step S1), and performs an image correction process according to a created histogram (step S2). That is, in the step S1, the histogram is created in a process as shown in FIG. 4, and then highlight and shadow points of an image are determined on the basis of the created histogram.

(Creation of Brightness Histogram)

FIG. 4 shows the flow chart for creating the brightness histogram according to the present embodiment.

In FIG. 4, the process enters into a routine for creating the brightness histogram of an original image in a step S401, and a selection ratio of pixels to be used for creating the brightness histogram is determined from the pixels of the original image in a step S402. In the present embodiment, it is assumed that, in a case where process-target image data includes 350,000 pixels, the brightness histogram intended for all the pixels is created (i.e., selection ratio is 1 (or 100%)). On one hand, in a case where the image data which includes the pixels of which the number exceeds 350,000 pixels is input, pixel selection (sampling) is performed according to the ratio of the number of the total pixels to 350,000 pixels. For example, if image data of 3,500,000 pixels is input, the selection ratio is 3,500,000/350,000=10, whereby the brightness histogram is created at a rate of one pixel every ten pixels (selection ratio is 10 (or 10%)). In any case, according to the present embodiment, a selection ratio n is obtained by an equation n=int(the number of total pixels in process-target image data/the number of reference pixels (350,000)). Here, it is assumed that n=1 if n<1, and n is a positive integer.

Subsequently, a counter for controlling a line number is reset or set to have a predetermined initial value in a step S403, and the counter is then incremented to have the line number of a noticeable line in a step S404.

In the embodiment, a thinning-out process (sampling) to the pixels is performed in regard to each line. Thus, in the case where the selection ratio is n, if the remainder when the line number is divided by n is 0, the pixel which belongs to the line in question is selected as the processing target (YES in a step S405). For example, in the case where the selection ratio is 10, if the remainder when the line number is divided by 10 is 0, the pixel which belongs to this line is selected as the processing target. On the other hand, if the noticeable line is the line to be thinned out, that is, if the noticeable line is not the process-target line, the flow returns to the step S404. If the noticeable line is the process-target line, the flow advances to a step S406 to sequentially perform a brightness conversion process and a chromaticity conversion process to the noticeable pixels belonging to the noticeable line. Here, it should be noted that, in the present embodiment, the brightness conversion and the chromaticity conversion are performed according to the following equations:

$Y \text{ (brightness)} = \text{int}(0.30R + 0.59G + 0.11B)$ $C1 \text{ (chromaticity)} = R - Y$ $C2 \text{ (chromaticity)} = B - Y$ In the equations, Y is a positive integer. Here, it should be noted that the brightness and chromaticity conversions can be performed according to various equations other than the above equations.

In the embodiment, in order to improve detection precision of a white position (highlight point) and a black position (shadow position), a saturation S of the noticeable pixel is calculated according to an equation S=sqrt(C1^2+C2^2) (where sqrt(x) indicates a function for providing the square root of x, and x^y indicates y-th power of x), so as to judge whether or not the saturation S is higher than a predetermined saturation value (Sconst) in a step S407. If S is higher than Sconst, the information of the pixel in question is not reflected on the brightness histogram.

That is, if S>Sconst, the flow returns to the step S406 not to reflect the data of the noticeable pixel on the following process. This is because, as described later, the saturation of the white position is provided by average saturation of a high-brightness pixel group and the value of this saturation is an error which occurs due to color fog, whereby it is preferable to eliminate the pixel essentially though to have high saturation from the calculation of the highlight point. Incidentally, the effect of the process in the steps S406 and S407 will be concretely explained. For example, in regard to the yellow pixel (R=G=255, B=0), the brightness Y and the saturation S of the yellow pixel are respectively 226 and 227 according to the above equations. That is, it is understood that the yellow pixel has extremely high brightness and includes a sufficiently high-saturation color. In regard to that kind of pixel, it is improper to understand that an achromatic-color pixel fogs or obscures yellow and the yellow pixel is resultingly obtained, that is, it is rather unmistakable if that kind of pixel is understood to be originally a yellow pixel. In any case, if such a high-brightness and high-saturation pixel is included in the histogram, an error occurs in the detected white position. Therefore, according to the present embodiment, the predetermined saturation Sconst is determined, and the pixel which has the saturation exceeding the predetermined saturation Sconst is not included in the histogram. By doing so, it is possible to prevent that, in the detected white position, the error occurs due to the high-saturation pixel, whereby it is possible to improve the detection precision of the white position.

As above, after the judgment in the step S407, the brightness histogram is created for the pixel which satisfies S≦Sconst (step S408). Here, since each of the R, G and B pixel data managed in the present embodiment is eight-bit (256 gradations) data, the brightness Y is converted to have the depth of 256, whereby the brightness histogram is obtained by calculating how many frequencies of the pixels of each of the brightness values of 256 levels from 0 to 255 levels exist.

Furthermore, in the present embodiment, since the calculated values of the chromaticity C1 and the chromaticity C2 are used as the data for calculating, in later color fog correction, the average chromaticity of the pixel having the respective brightness values, these values are held as follows. That is, three members of a frequency, a C1 accumulation value and a C2 accumulation value are set in the form of structure arrangement parameters of which the index range is 0 to 255, and the calculated result of each pixel is reflected on each member having the brightness value of this pixel as an index.

If the process to the noticeable pixel ends, then it is judged whether or not the process to all the pixels in the noticeable line end (step S409). If the pixel not yet processed remains in the noticeable line, the flow returns to the step S406 to repeat the processes in and after the step S406. On the other hand, if the process to all the pixels in the noticeable line ends, it is further judged in a step S410 whether or not the line not yet processed remains. If process to all the lines ends, the process ends in a step S411. On the other hand, if the line not yet processed remains, the flow returns to the step S404 to shift the noticeable line to a next line and repeat the process.

As above, by creating the brightness histogram while selecting the pixel of the original image data, the brightness histogram taking account of the precision in the later white and black position detection can be created with a minimum number of pixels.

(Detection of White Position and Black Position)

After the brightness histogram completed, the white position (highlight point) and the black position (shadow point) are determined. In the present embodiment, the point where the accumulated brightness frequency value toward the center from the brightness value 0 on the brightness histogram is 1750 is set as the black position, and the accumulated brightness frequency value toward the center from the brightness value 255 is 1750 is set at the white position.

That is, if it is assumed that the frequency of the pixel of the brightness value Y is PY, the accumulated frequency is obtained such as P0+P1+ . . . , and the brightness value at a time when the accumulated frequency exceeds 1750 is set as the brightness value YSD of the black position. Then, the average chromaticity of the pixels having the brightness value YSD is obtained. As described above, the accumulated chromaticity of the pixels of the brightness N of which the accumulated value of the chromaticity of each brightness value has been calculated at a time when the brightness histogram was created is set as C1Ntotal and C2Ntotal. Thus, the average chromaticity (C1SD, C2SD) of the pixels of the brightness value YSD being the black position is obtained as follows:

$$C1SD = C1YSDtotal/PYSD$$

$$C2SD = C2YSDtotal/PYSD$$

Then, the white position is similarly determined. That is, the accumulated frequency is obtained such as P255+ P244+ . . . , and the brightness value at a time when the accumulated frequency exceeds 1750 is set as the brightness value YHL of the black position. Then, the average chromaticity (C1HL, C2HL) of the pixels having the brightness value YHL is obtained as follows:

$$C1HL = C1YHLtotal/PYHL$$

$$C2HL = C2YHLtotal/PYHL$$

By the above calculation, the white position (C1HL, C2HL, YHL) and the black position (C1SD, C2SD, YSD) can be obtained in a (C1, C2, Y) color space.

Although the accumulated frequencies are obtained from the brightness positions of the brightness value 0 and the brightness value 255 in the present embodiment, a predetermined offset may be rendered. That is, for example, the accumulated frequencies may be obtained from the brightness positions of the brightness value 1 and the brightness value 254.

As above, the white position (highlight point) and the black position (shadow point) are determined in the step S1 of FIG. 3.

Then, in the step S2 of FIG. 3, the image correction process is performed on the basis of the white position and the black position both determined in the step S1. In the present embodiment, the color fog correction to correct the color fog of the original image, exposure correction to correct the contrast of the brightness for optimizing the exposure of the original image, and saturation correction to improve the sight of the color on an output image are performed as the image correction process.

Figure 9:
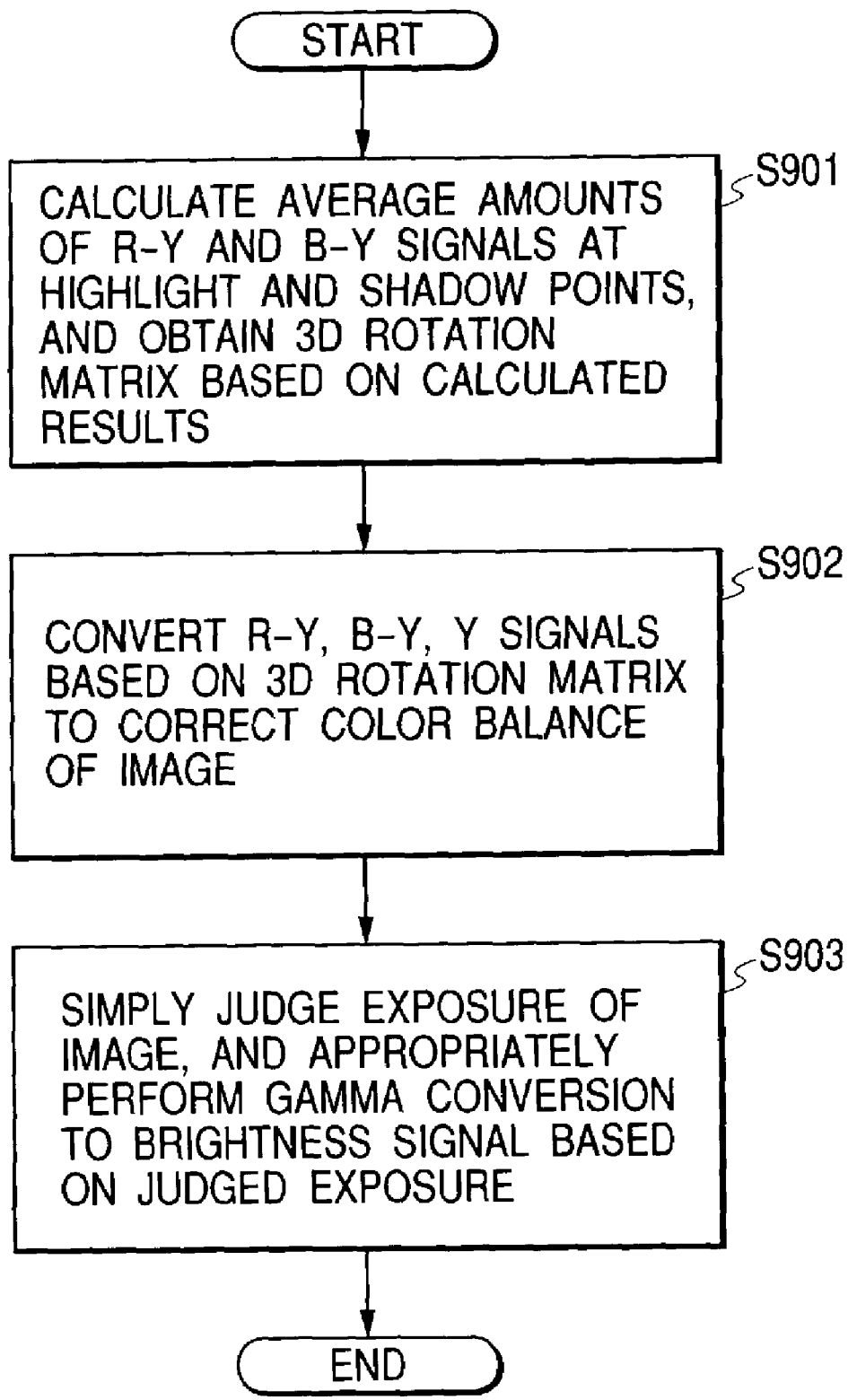
FIG. 9 is a flow chart showing a control procedure of image correction.

FIG. 9 shows the flow of the correction process which is performed by the image correction processing unit 113 in the step S2 of FIG. 3. That is, a rotation matrix for the color fog correction is first obtained (step S901), the color balance (color fog) is corrected by using the obtained rotation matrix (step S902), and gamma conversion is then performed to the brightness signal in accordance with an exposure state of the image (step S903). Hereinafter, the correction process will be explained sequentially.

(Color Fog Correction)

If the white position and the black position in the (C1, C2, Y) color space of the original image are obtained, then the color fog is corrected.

Figure 5B:
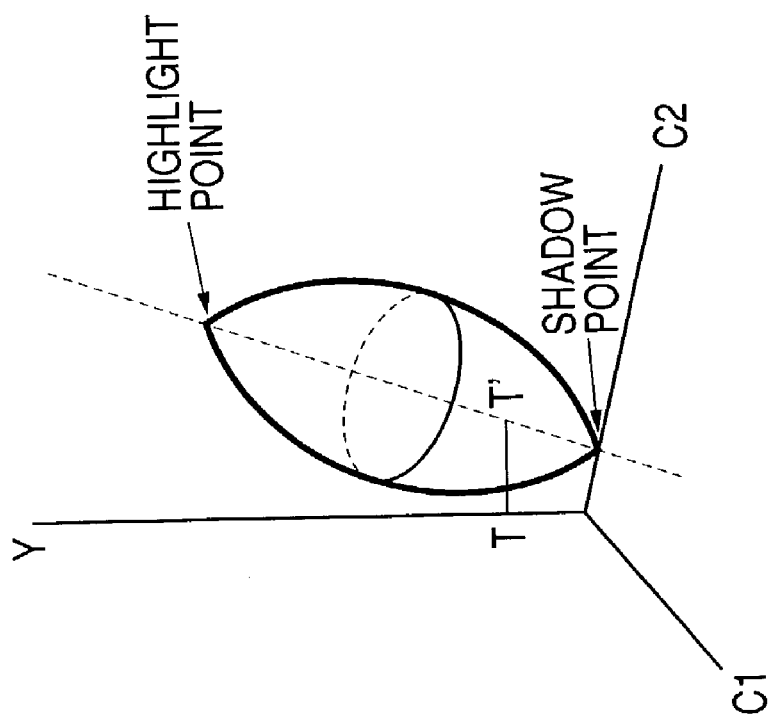
FIGS. 5A and 5B are color solid diagrams for explaining the principle of color balance correction in the embodiment, that is.

If the original image does not include any color fog, that is, the original image is an ideal image, the achromatic color is R=G=B and the calculated value of the chromaticity of the white and black positions is C1HL=C2HL=C1SD=C2SD=0. However, if the original image includes the color fog, the straight line (color solid axis) between the white position (C1HL, C2HL, YHL) and the black position (C1SD, C2SD, YSD) inclines toward the hue direction of the color fog in proportion to the extent of the color fog in question (FIG. 5B). Thus, the color fog correction can be achieved by the conversion to conform the color solid axis and the Y axis (brightness axis) to each other. Here, it should be noted that the conversion can be achieved by the rotation and the parallel movement of the color solid or by converting a coordinate system.

Figure 5A:
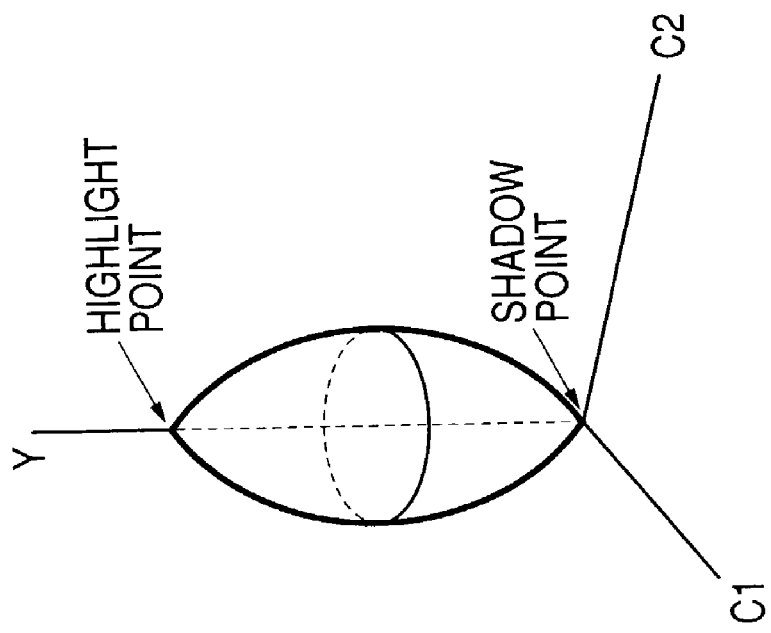

In the present embodiment, in the color solid of the original image, the color solid axis is first rotated based on the lowest brightness point (lower end point) of the color solid axis so that the color solid axis becomes parallel with the Y axis. Then, the coordinate system is converted so that the position of the lowest brightness point becomes the origin of the (C1, C2, Y) color space. By the above process, it is possible to obtain the conversion result that the lowest brightness point is the origin and the color solid axis conforms to the Y axis. Here, FIG. 5A shows the color solid which shows the ideal color distribution of the image data. Thus, it is possible to approximate the color solid after the above conversion to the ideal color solid (FIG. 5A).

Furthermore, when the color solid axis is rotated so as to become parallel with the Y axis, the rotation axis and the rotation angle can be easily determined from the coordinate values of the highlight and shadow points. Incidentally, since a method of determining a rotation matrix to rotate a solid around a desired rotation axis by a desired angle in a three-dimensional space is well known, the detailed explanation thereof will be omitted.

As above, each pixel of the original image is converted into the pixel data (C1, C2, Y) in the three-dimensional color space including the chromaticity axis and the brightness axis, and the obtained data is rotation and parallel-movement converted into pixel data (C1', C2', Y') so that the color solid axis (gray line) connecting the black and white positions with each other conforms to the Y axis and the lowest brightness becomes the coordinate origin, whereby the color fog can be corrected.

(Adjustment of Contrast and Saturation)

Next, a method of simply judging overexposure or underexposure of an image and then performing gamma correction to the brightness signal of the image in question based on the judged result, in order to achieve a further high-quality image based on the adjustment of contrast and saturation, will be explained.

It should be noted that such a process is the part of the color balance correction and thus does not take account of any exposure data included in the shooting condition data 106, whereby this process is different from later-described lightness correction which takes account of the value of the exposure data.

The contrast is adjusted by adjusting the brightness of the black position (shadow point) to 0 or a value close to 0 (e.g., 10) and also adjusting the brightness of the white position (highlight point) to 255 or a value close to 255 (e.g., 245).

Next, the case of simply judging the overexposure or the underexposure of the image and then performing the gamma correction to the image data based on the judged result will be explained.

First, the points that the distance between the color solid axis to be corrected and the brightness (Y) axis becomes minimum, i.e., points T and T' in FIG. 5B, are obtained. These points can be easily obtained from geometrical relation.

Then, the contrast is adjusted so that the brightness component YT' after the color fog correction becomes the brightness component YT at the point T. That is, as shown in FIG. 6, in a case where the point (YT', YT) is set as the turning point, if the brightness Y' after the color fog correction is lower than the brightness component YT', the brightness is corrected to have the value Y" by the function given as a straight line a, while if the brightness Y' is higher than the brightness component YT', the brightness is corrected to have the value Y" by the function given as a straight line b.

Figure 6:
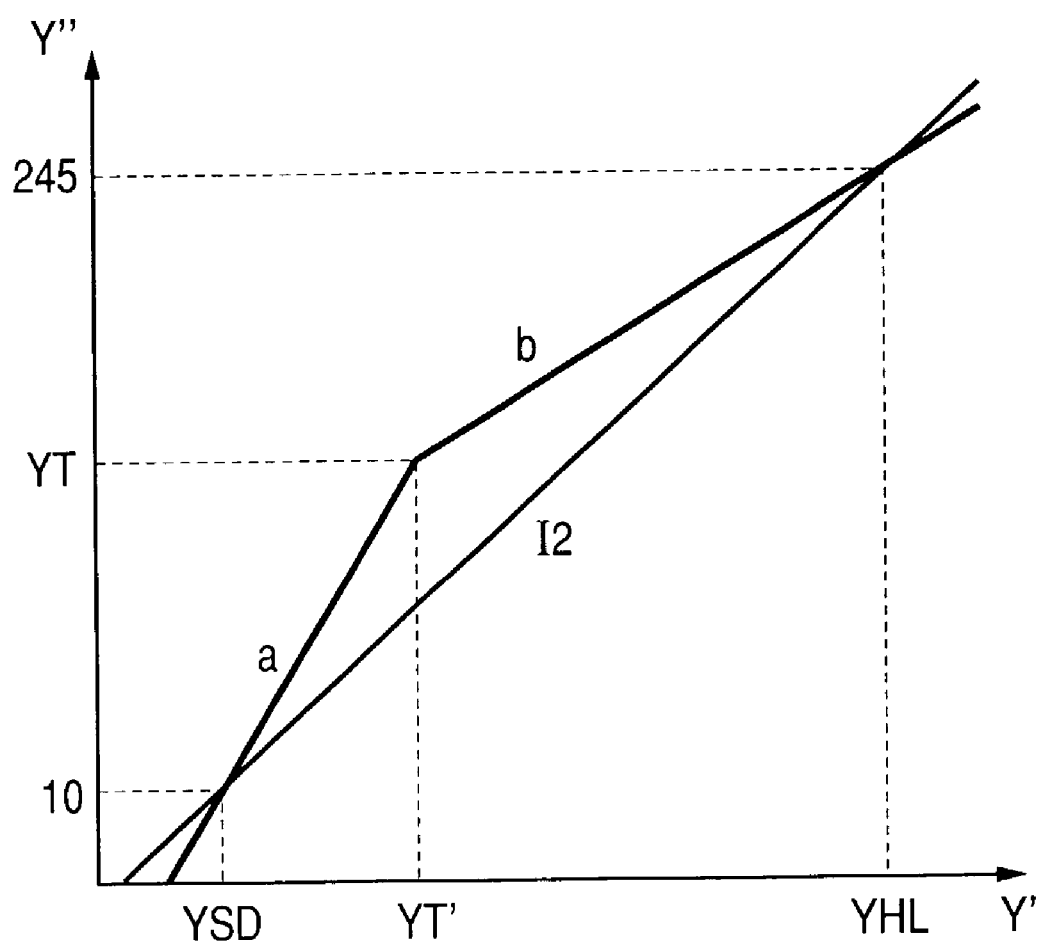
FIG. 6 is a graph showing a non-linear gamma conversion function.

It should be noted that, of course, the correction by the function given as a straight line I2 of FIG. 6 may be performed without using the points T and T'. When the color solid axis is parallel with the brightness axis, the relation between the points T and T' is not 1:1. Furthermore, when the points T and T' are outside the range (0, 255), the point (YT', YT) cannot be set as the turning point. In these specific cases, the color fog only has to be corrected according to the straight line I2.

Figure 7A:
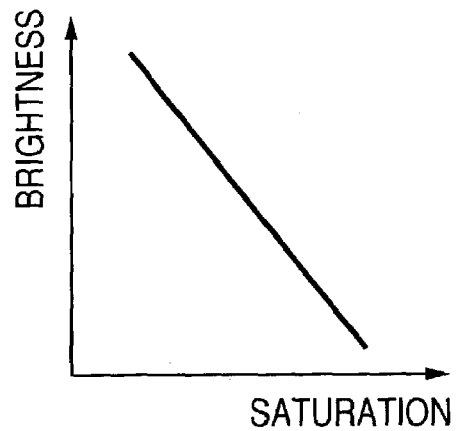
FIGS. 7A, 7B, 7C and 7D are diagrams showing the features of overexposure and underexposure on a brightness-saturation plane, that is.
Figure 7B:
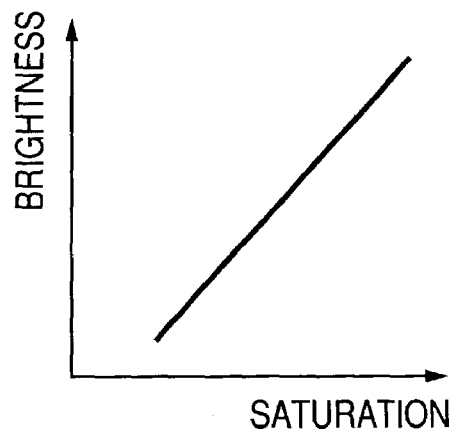

The correction using the most closest points T and T' on the straight line particularly acts on an overexposure or underexposure image. That is, the reason why overexposure appears is that the entire image is pulled toward a light subject such as sky or the like. In this case, high-brightness color is suppressed in an input device as represented by a digital camera, whereby the saturation of the high-brightness portion is lowered. More specifically, if the color solid axis of the image to which the high-brightness color has been suppressed is considered on the two-dimensional plane having the saturation and brightness axes as shown in FIG. 7A, the pixel which is closest to achromatic color appears at the high-brightness portion. On the contrary, since low-brightness color is suppressed for an underexposure image, the saturation is low in the low-brightness portion as shown in FIG. 7B.

Figure 7C:
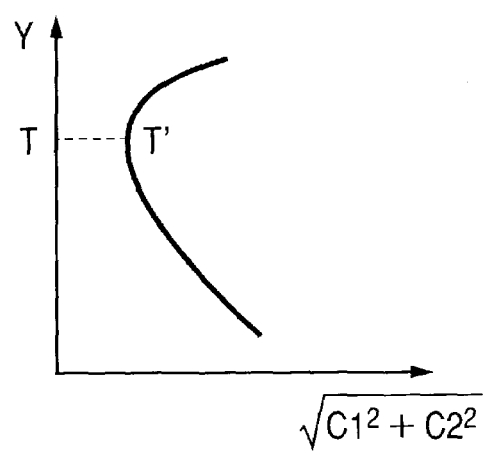
Figure 7D:
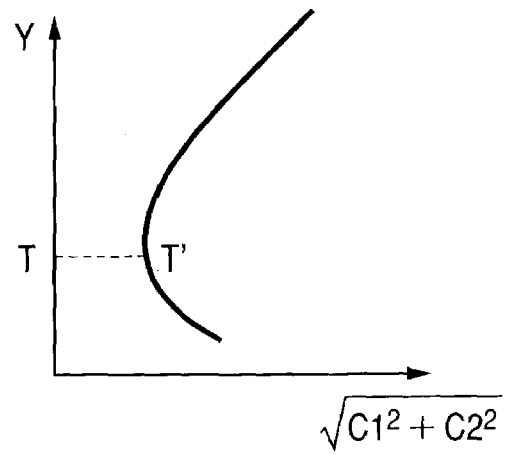

Then, in actual images, if the brightness axis of the color solid is considered on the brightness-saturation plane, the overexposure image is represented as shown in, e.g., FIG. 7C, while the underexposure image is represented as shown in, e.g., FIG. 7D. If it is assumed that the actual color solid is shifted or deviated from the inherent (ideal) color solid due to a shooting condition of some kind and/or an influence of data input (at a time of A/D conversion), it is considered that the position connecting the points T and T' with each other is the minimum-shift (or minimum-deviation) position. Therefore, in the present embodiment, by restituting the shift at this position, it is possible to easily perform appropriate gray (entire lightness) correction.

Of course, it is possible to merely use the point T as a means for simply judging the overexposure and underexposure of the image to previously prepare LUT's (look-up tables) for the overexposure and the underexposure, and thus perform the gamma adjustment (correction) of the brightness signal according to the brightness components of the points T and T'. For example, the contrast may be adjusted according to the curve having the point (YT', YT) as the turning point shown in FIG. 6. Therefore, it is possible to easily judge whether the target image is overexposed or underexposed on the basis of the values of the points T and T'. In other words, if the brightness component of the point T' of which the saturation is lowest on the color solid axis is at the higher-brightness side, the relation of brightness-saturation of this image shows a tendency as shown in FIG. 7A, while if the brightness component of the point T' is at the lower-brightness side, the relation of brightness-saturation of this image shows a tendency as shown in FIG. 7B. Therefore, in the image of which the high-brightness color and the low-brightness color are suppressed, if the brightness component of the point T' is at the higher-brightness side, it is thought that this image tends to be overexposed, while if the brightness component of the point T' is at the lower-brightness side, it is thought this image tends to be underexposed.

On one hand, it is possibly to easily adjust and correct the saturation by multiplying the chromaticity C1 and the chromaticity C2 by a saturation correction coefficient. For example, in case of increasing the saturation by 20%, since the saturation after correction becomes 120% of the saturation before correction, the saturation is corrected by using the saturation correction coefficient 1.2.

That is, in practice, the saturation correction can be performed according to the following equations:

$$C1''=1.2 \times C1'$$

$$C2''=1.2 \times C2'$$

Here, it should be noted that this is because the saturation is defined by S=sqrt(C1^2+C2^2).

(Inverse Conversion into RGB Color Space)

The various correction processes in the present embodiment end as above. At this moment, since each pixel of the original image is in the state that the color signal data of (R, G, B) has been converted into the color space data of (C1'', C2'', Y''), the color space data of (C1'', C2'', Y'') is again inverse-converted into the color signal data of (R', G', B'). Here, the inverse conversion is performed according to the following equations:

$$R'=Y''+C1''$$

$$G'=Y''-(0.3/0.59)*C1''-(0.11/0.59)*C2''$$

$$B'=Y''+C2''$$

As above, the R, G and B data of which the color fog, the contrast and the saturation have been corrected can be obtained in regard to the original image.

As can be seen, according to the present embodiment, the color fog correction can be surely performed with a less processing load. Furthermore, according to the present embodiment, since a sampling condition is set according to the image data size of the original image, the relation between the total frequency of the histogram and the accumulated frequency for determining the white and black positions can be made substantially constant, whereby the excellent color fog correction can be achieved.

Moreover, according to the present embodiment, the entire image is linearly gamma-corrected so as to maintain the brightness at the point where the distance between the color solid axis of the correction-target image and the brightness axis is shortest, whereby it is possible to correct the contrast as maintaining the brightness which is considered to be closest to the value of the original image.

Moreover, it is possible to easily judge the exposure state of the image, i.e., whether the image is overexposed or underexposed, and it is also possible to perform the gamma correction by appropriately selecting the table which is different in regard to the judged exposure state. However, such a means for judging the exposure is simply performed by analyzing the image data with use of the histogram, but is different from a method of judging the exposure state on the basis of the shooting condition data 106.

Here, it should be noted that the sampling may be performed in units of column instead of line.

(Second Processing Method)

Next, the second processing method which takes account of the level of correction as compared with the above first processing method will be explained according to the second embodiment.

As explained in the first processing method, in the case where the color solid axis of the image is obtained, if the inclination of this axis is overly large, there is the fear that a problem occurs in the image if the correction is performed in disregard of this inclination. For example, when a user intentionally gives the color fog by using a color filter or the like, or when the user shoots an evening glow scene, such a problem occurs.

In this case, it is possible to eliminate this problem by not performing the correction under the judgment that the obtained highlight and shadow points are erroneous or by appropriately adjusting a rotation angle to decrease the level of correction. In this connection, the judgment that the obtained highlight and shadow points are erroneous can be achieved on the basis of the direction of the color solid axis. Since it is possible from the inclination of the color solid axis to easily judge which color is fogged, it is also possible not to correct the color fog in regard to the image shot by, e.g., the color filter so as to aim at a specific effect.

In such a case, by paying attention to the angle between the direction vector of the color solid axis of the original image and the brightness axis, it is judged that the problem occur contrarily if the color correction is performed, thereby refraining from performing the process or decreasing the level of process. For example, the color solid axis is inclined toward the hue direction at an angle equal to or larger than a predetermined angle, e.g., 40°, it is judged that the image in question is the inherently color-fogged image such as an evening glow image. In case of decreasing the level of process, the color solid axis is raised by a predetermined angle, e.g., 20° or raised until the inclination of the color solid axis to the Y axis becomes a predetermined angle, e.g., 20°, thereby correcting the color fog. Here, it should be noted that the rotation matrix for such a conversion can be easily obtained from the rotation axis and the rotation angle.

Furthermore, the level of process (i.e., correction) may be manually designated by a user or may be previously set according to the angle and the color solid axis direction. For example, although the color solid axis is raised by 20° if the color solid axis is inclined toward the hue direction at 40° in the above example, the level of angle to be raised may be set by the user. The following process is the same as that in the first processing method.

Moreover, since it is possible from the inclination of the color solid axis to easily judge which color is fogged, it is also possible not to correct the color direction of the filter in regard to the image shot by, e.g., the color filter so as to aim at the specific effect. That is, in such a case, the color of which the color fog is not to be corrected is first designated, the rotation axis of the rotation conversion is set along the direction of the color not to be corrected on the C1-C2 plane, and the color solid is rotation-converted until the plane including the rotation axis and the color solid axis becomes parallel with the Y axis. By doing so, the color fog can be corrected only for a specific color component.

Figure 10:
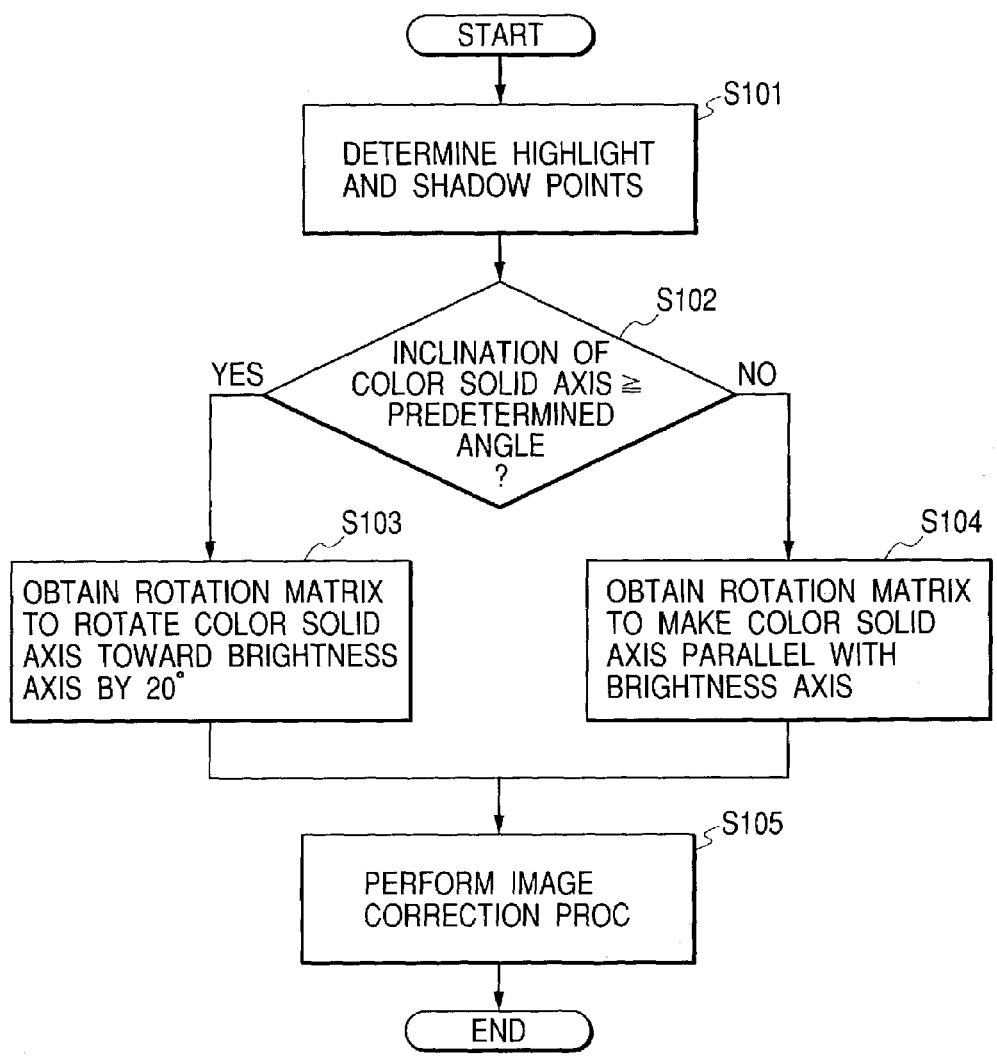
FIG. 10 is a flow chart showing a control procedure of color fog correction in the second embodiment.

FIG. 10 is the flow chart showing the control procedure to correct the image so that, in the case where the color solid axis is inclined equal to or larger than the predetermined angle, the color solid is rotated up to a separately designated angle. First, in a step S101, the highlight and shadow points are determined, and then it is judged in a step S102 whether or not the inclination of the color solid axis is equal to or larger than the predetermined angle. If the inclination is smaller than the predetermined angle, then in steps S104 and S105 the conversion is performed so that the color solid axis coincides with the brightness axis in the same manner as that in the first processing method, thereby correcting the color fog.

On the other hand, if the inclination of the color solid axis is equal to or larger than the predetermined angle, the rotation matrix to rotate the color solid axis toward the brightness axis by 20° is obtained in a step S103, and then the color solid is rotated by using the obtained rotation matrix in the step S105, thereby correcting the color fog. In this case, it should be noted that the angle 20° used in the step S103 may be designated by the user through a user interface of an application program or may be given as a default value by an application program.

Furthermore, two kinds of thresholds may be provided. In such a case, if the inclination of the color solid axis is larger than a first threshold (e.g., 40°), it is possible to perform the rotation conversion to raise the color solid axis by, e.g., 20° to the extent that the color solid axis does not become a complete gray line. Moreover, if the inclination of the color solid axis is between the first threshold and a second threshold (e.g., 20°), it is possible not to perform the rotation conversion, if the inclination of the color solid axis is smaller than the second threshold, it is possible to perform the rotation conversion to coincide the color solid axis and the brightness axis with each other. In this case, it should be noted that the thresholds may be initially set by the user through a UI or may be given as default values by an application program. By doing so, improper correction is not performed to the image to which the color fog has been intentionally given.

As above, according to the second processing method (second embodiment), at least the two or more thresholds necessary to determine the correction are provided on the basis of the inclination of the color solid axis consisting of the pixels of the image data, i.e., two the amounts of the color direction and the inclination angle of the axis, and then it is judged based on these threshold values whether or not the image should be corrected and whether or not the level of correction should be adjusted. Therefore, it is possible to very easily eliminate only the adverse effect in a special case.

Furthermore, since it is possible based on the direction of the color solid axis to judge which color is fogged, it is possible not to correct the color fog according to the color direction of the color fog.

(Third Processing Method)

In the first and second processing methods, the color balance correction based on the highlight and shadow points of the image is performed. On one hand, a method (third embodiment) of performing the correction based on other reference points will be explained hereinafter.

First, an average color difference amount $\Delta E$ is obtained as follows:

$$\Delta E = \text{sqrt}((C1HL - C1SD)^2 + (C2HL - C2SD)^2)$$

Figure 8:
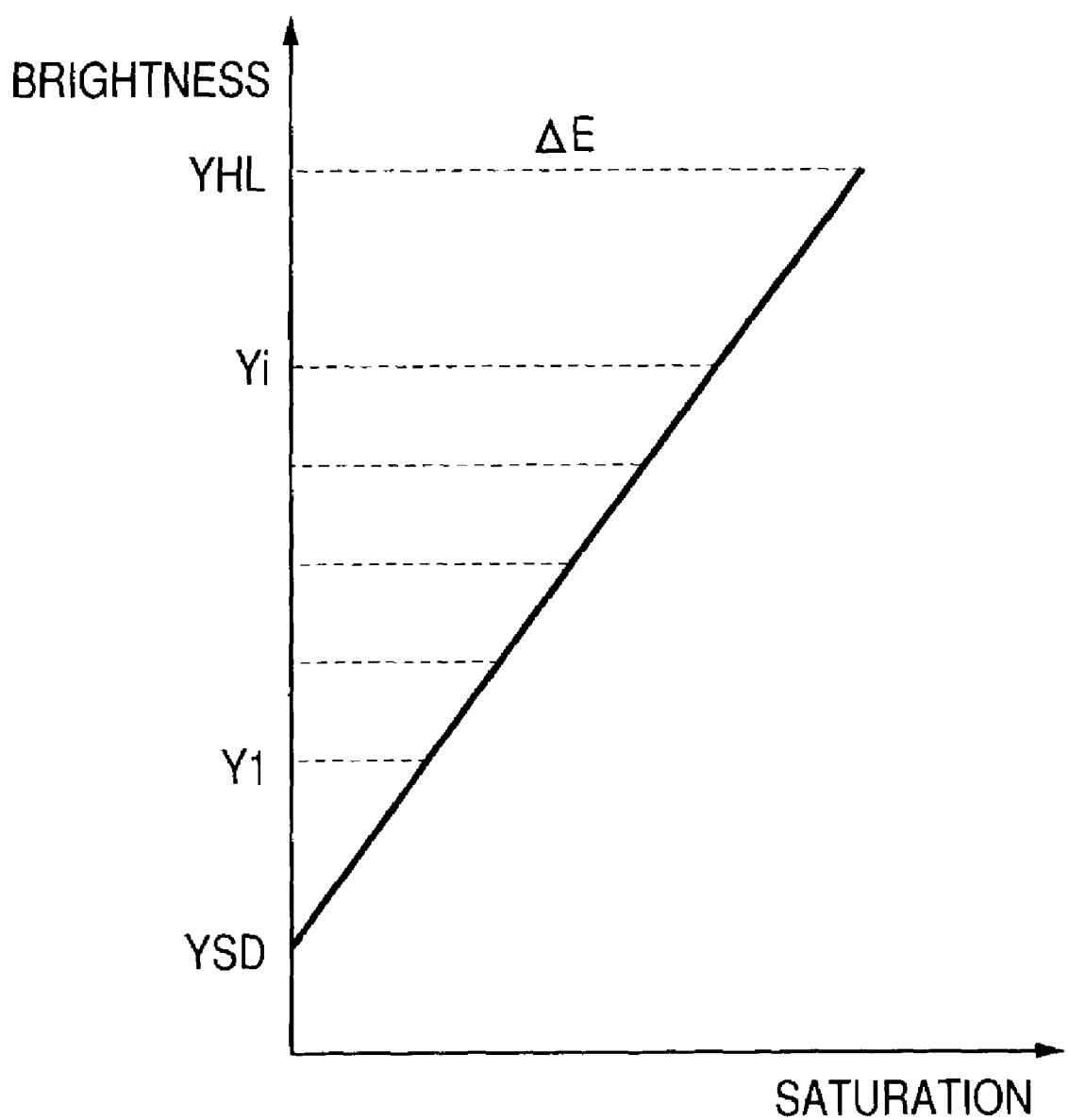
FIG. 8 is a diagram showing a condition that a color solid axis in the third embodiment is determined.

If the color solid axis is parallel with the brightness axis, it is sure to become $\Delta E = 0$. On the other hand, if the color solid axis is inclined, $\Delta E$ becomes the value larger than 0. That is, if the average color difference amount $\Delta E$ is considered on the E(saturation)–Y(brightness) plane, the value $\Delta E$ is given as shown in FIG. 8.

Next, several kinds of sample brightness between the highlight and shadow points are prepared. The average color difference amount is obtained from the pixels of, e.g., predetermined brightness Yn in the several kinds of sample brightness in the image by using the pixel of the saturation smaller than a value $\Delta En$. Here, it should be noted preset certain saturation may be used as the value $\Delta En$, and alternatively, the average color difference amount which is limited in the inclination direction of the color solid axis may be obtained.

A straight line is obtained in regard to the plural kinds of sample brightness according to a method of least squares based on the average color difference, and the process according to the first processing method is performed by using the obtained straight line as the color solid axis of the original image.

Alternatively, an approximated curve of the points consisting of the obtained color difference and the obtained brightness may be obtained by using a B-spline curve or the like, so as to perform the non-linear color balance correction so that the obtained approximated curve is set as the brightness axis, that is, the color difference becomes 0.

As above, the present invention is explained with reference to the preferred embodiments. However, the present invention is not limited to these embodiments, but can be modified variously within the scope of the appended claims.

Thus, the line to be set as the brightness axis can be obtained from not only the highlight and shadow points but also the pixels uniformly sampled form the entire image. Then, the image data is converted so that the obtained line coincides with the brightness axis, whereby it is possible to perform the color fog correction in which the characteristic of the entire image is reflected.

Incidentally, in a case where a white balance is automatically adjusted, the correction amount of the color balance may be variable according to the shift amount from the reference value. For example, if the information representing that the white balance is seriously shifted toward the blue direction from the reference value is obtained in addition to the information representing that the white balance is automatically adjusted, the threshold may be set so that the color balance correction easily trends toward the yellow direction opposite to the blue direction in the color difference signal, whereby the correction process with higher precision can be performed.

(Density Correction)

Next, the density correction to be performed by the image correction processing unit 113 will be explained. In the density correction, the information concerning exposure or the information concerning on/off of stroboscopic light emission is read from the shooting condition data 106, and the optimum lightness correction (i.e., print density correction) is performed based on the read information.

(Judgment of Gradation Curve)

Figure 11:
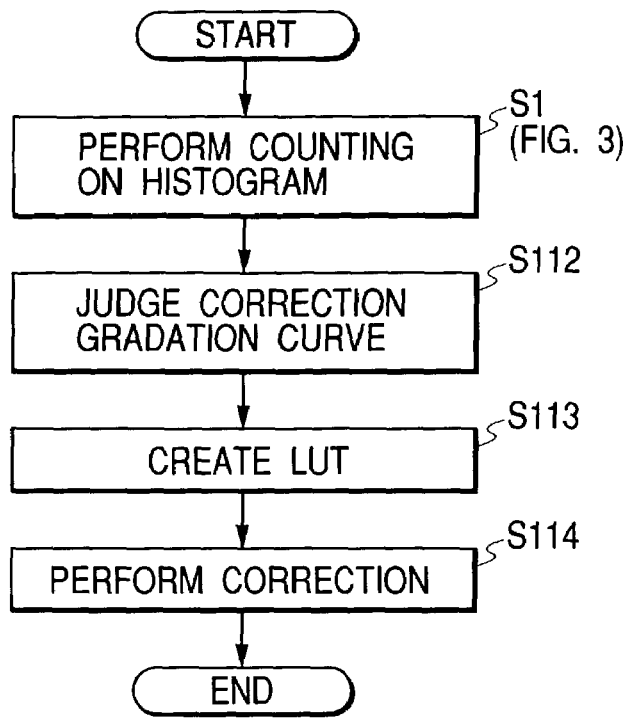
FIG. 11 is a flow chart showing a procedure of an automatic gradation correction process.

In a step S112 of FIG. 11, a correction condition setting process (correction gradation curve judgment process) is performed on the basis of the histogram obtained in the step S1 of FIG. 3. That is, from previously prepared plural gradation curves for brightness correction, the appropriate gradation curve is selected on the basis of an image analysis result.

When the gradation curve is judged in the embodiment, the lightness of the image is judged on the basis of the three parameters (i.e., highlight point, shadow point, and the number of pixels of certain brightness area), and the gradation curve is selected on the basis of the judged result.

Figure 12:
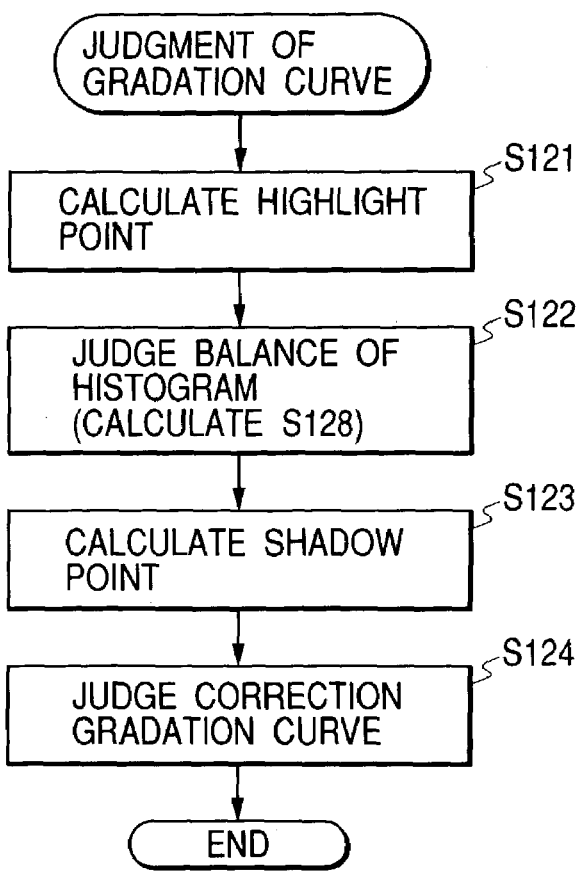
FIG. 12 is a flow chart showing a procedure of a gradation curve judgment process in the automatic gradation correction process shown in FIG. 11.

FIG. 12 is a flow chart showing the details of the gradation curve judgment process. Then, the gradation curve judgment process according to the embodiment will be explained with reference to FIG. 12.

(1) Highlight Point Judgment

In a highlight point judgment process in a step S121 of FIG. 12, the highlight point in the processing-target image is calculated according to the histogram.

In the embodiment, the frequencies of the respective brightness values are sequentially accumulated from the maximum brightness value (255) of the brightness range toward the lower-brightness side on the histogram of the brightness signal Y. Then, for example, the brightness value at which the obtained accumulated frequency coincides with 1.0% of the number of the total pixels of the processing-target image data or the brightness value at which the obtained accumulated frequency first exceeds 1.0% of the number of the total pixels is obtained, and the obtained brightness value is set as the highlight point (HLP).

Then, the highlight point HLP is compared with plural predetermined thresholds Th_H1, Th_H2, . . . (Th_H1< Th_H2<. . . ), whereby the distribution of the histogram in the high-brightness area is analyzed.

For example, in the embodiment, as shown in FIG. 13, a case where the two thresholds to which the values of 200 and 230 are respectively set in due order from the bottom are used will be explained.

Then, if HLP<Th_H1, the image is judged as a dark image of which the high-brightness area is small. If Th_H1≦HLP<Th_H2, the image is judged as an image which is dark as a whole although it includes the distribution of the high-brightness area. If Th_H2≦HLP, the image is judged as a light image which includes many distributions in the high-brightness area.

Figure 14:
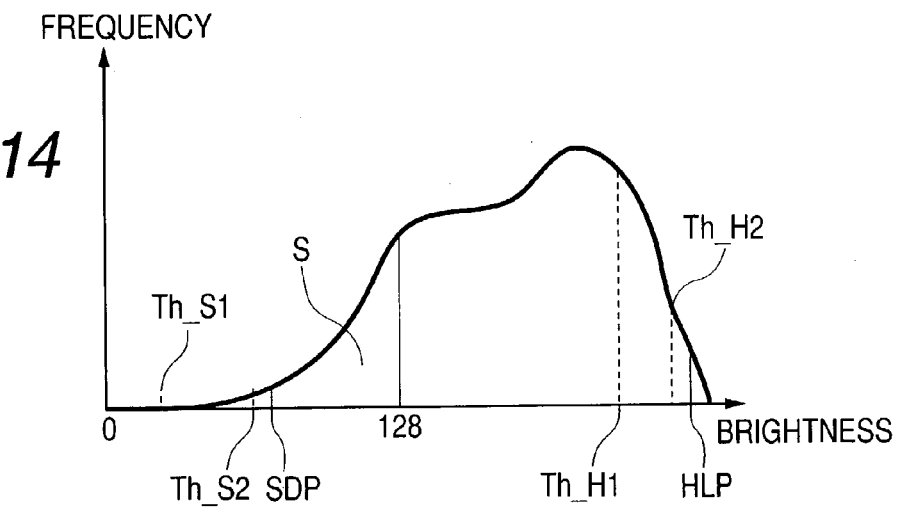
FIG. 14 is a diagram showing a histogram in a case where an image to be processed in the automatic gradation correction process is a light image.

For example, on the histogram of a lightish image as shown in FIG. 14, HLP exceeds the threshold Th_H2 (HLP>Th_H2), whereby the image is judged as an image which includes many distributions in the high-brightness area. On the histogram shown in FIG. 14, the distributions are entirely biased toward the higher-brightness side, whereby the highlight point HLP is resultingly located at the higher-brightness side. Generally, the image showing the distributions of this type is often a light image.

Figure 15:
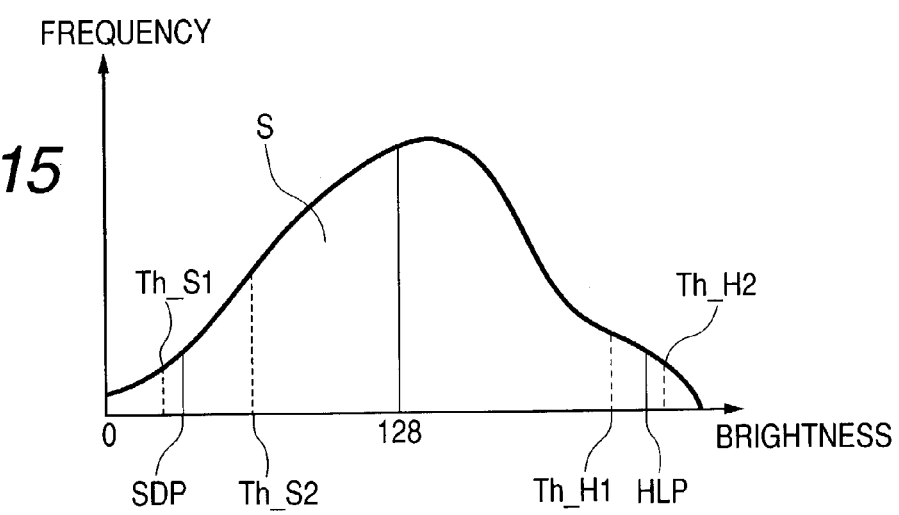
FIG. 15 is a diagram showing a histogram in a case where an image to be processed in the automatic gradation correction process is a moderate light image.

On the histogram shown in FIG. 15, HLP is lower than the threshold Th_H2 and higher than the threshold Th_H1 (Th_H1<HLP≦Th_H2), whereby the image is judged as an image which is not so light although it includes the certain measure of distributions in the high-brightness area. This is because, on the histogram shown in FIG. 15, the brightness roughly shows the intermediate distributions, and the highlight point HLP is located relatively at the lower-brightness side.

Figure 16:
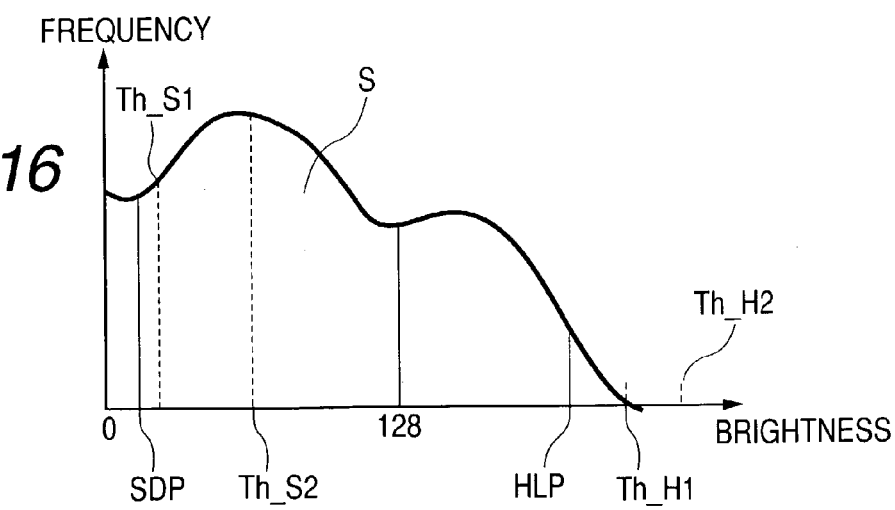
FIG. 16 is a diagram showing a histogram in a case where an image to be processed in the automatic gradation correction process is a dark image.

On the histogram shown in FIG. 16, HLP is lower than the threshold Th_H1, whereby the image is judged as an image which does not include the distribution in the high-brightness area. In this case, the histogram is biased toward the lower-brightness side, whereby it is considered that the image in question is dark as a whole. Furthermore, the fact that HLP is low means that also the gradation level is low. In regard to the image of this type, it is necessary to perform the gamma correction or expand the brightness value toward the higher-brightness side to lighten it.

Here, it should be noted that the calculation of the highlight point HLP need not necessarily depend on the above method, that is, various methods conventionally known may be used appropriately.

Furthermore, if the automatic gradation correction process in the embodiment is combined with other image correction process such as the color fog correction process, the contrast correction process, the saturation correction process or the like, the HLP previously used in the image correction process can be used. In this case, the lightness (darkness) of the image can be judged by using, instead of the highlight point, the shadow point similarly used in the color fog correction process or the like, and it will be apparent from the following explanation that the following process can be performed based on the judged lightness (darkness).

(2) Histogram Balance Judgment

In a step S122 of FIG. 12, the histogram balance judgment is performed by using the histogram obtained in the step S1 (FIG. 3) shown in FIG. 11.

In the histogram balance judgment process, a rate Slow of the accumulated frequency of the predetermined area to the number of the total pixels in the processing-target image is obtained. That is, for example, the rate of the number of the accumulated pixels from the brightness values 0 to 128 (i.e., half of the histogram) to the number of the total pixels in the image of 256 gradations is first obtained, and the entire balance of the histogram of this image is analyzed.

First, an accumulated frequency S of the certain brightness area (0 to 128) is obtained. Here, it should be noted that the accumulated frequency S is obtained as the accumulated frequency obtained from the least brightness value (value 0) up to a predetermined brightness value toward the higher-brightness side within the brightness range on the histogram. In the embodiment, the accumulated frequency up to the brightness value (value 128) being ½ of the maximum brightness value (value 255) is used as the accumulated frequency S in the low-brightness area, but, of course, other value may be used.

Next, the rate Slow of the accumulated frequency S to the number of the total pixels is calculated by using the following equation:

Slow=(accumulated frequency $S$ of certain brightness area)/(the number of total pixels) (%)

Here, if the thinned-out histogram is created by thinning out the pixels in the histogram calculation, it should be noted that the denominator of the above equation is defined by the number of the pixels being the target of the histogram creation.

Next, the threshold is again judged by using the obtained accumulated frequency Slow. That is, the rate of the lower half of the histogram to the entire histogram is calculated, whereby the entire brightness balance of the image is analyzed. In the above highlight point judgment, the image is classified into the several kinds according to the distribution state of the high-brightness area on the histogram. However, as shown in FIG. 13, the thresholds are provided corresponding to the respective cases, and the balance of the histogram is judged.

For example, in regard to the lightish image as shown in FIG. 14, the rate to the number of the total pixels up to the brightness value 128 is set as the accumulated frequency Slow. In this case, since Slow is 20% of the number of the total pixels, the image in question is judged as the light image and Slow is judged to be within the range of 16 to 50 in the HLP judgment.

On the other hand, in regard to the darkish image as shown in FIG. 16, Slow is 60% of the number of the total pixels in the area up to the brightness value 128, whereby the image in question is judged as the dark image and Slow is judged to be within the range of 50 to 80 in the HLP judgment.

In a method of judging the balance of the histogram by using the intermediate value and the average value of the histogram, without using the rate of the accumulated frequency in the certain brightness area, the lightness of the image in which the actual distribution state of the histogram is not appropriately reflected is judged. For example, it is assumed that there is an image in which the intermediate value and the average value themselves show the relatively high brightness values, but in practice the brightness values around the intermediate value and the average value have the peak of the frequency distribution and the frequency distribution itself of the low brightness area is small. In the image of this type, there is the fear that this image is erroneously judged as a lightish image, the brightness correction to increase the density is thus selected, and the dark portion occupying the relatively large part of this image is resultingly defaced.

On the other hand, according to the embodiment, the accumulated frequency in the area of the brightness values 0 to 128 being the lower half of the histogram is obtained, and the rate Slow of the obtained accumulated frequency to the number of the total pixels is used, whereby it is possible to judge the lightness distribution of the image in which the actual balance of the histogram is sufficiently reflected. Thus, it is possible to perform the appropriate gradation correction even to such a darkish image as above.

Incidentally, in regard to the range of the rate Slow, the range of the brightness values 0 to 128 is uniformly classified in the embodiment. However, in case of obtaining the information of the low-brightness area in more detail, the low-brightness area in question may be divided into several small areas to perform the process for each small area. Furthermore, the rate Slow of the range of the brightness values 0 to 64 may be weighted by doubling and adding, and the rate Slow of the range of the brightness values 65 to 128 may be weighted by one-multiplying and adding.

By doing so, it is possible to further precisely judge the balance of the histogram.

(3) Shadow Point Judgment

In a shadow point judgment process in a step S123 of FIG. 12, the shadow point in the processing-target image is calculated according to the histogram.

In the embodiment, the frequencies of the respective brightness values are sequentially accumulated from the minimum brightness value (0) of the brightness range toward the higher-brightness side on the histogram. Then, for example, the brightness value at which the obtained accumulated frequency coincides with 1.0% of the number of the total pixels of the processing-target image data or the brightness value at which the obtained accumulated frequency first exceeds 1.0% of the number of the total pixels is obtained, and the obtained brightness value is set as the shadow point (SDP).

Then, the shadow point SDP is compared with plural predetermined thresholds Th_S1, Th_S2, . . . (Th_S1<Th_S2<. . . ), whereby the distribution of the histogram in the low-brightness area is analyzed.

Incidentally, since the shadow point judgment used in the embodiment is performed after the highlight point judgment and the histogram balance judgment, as shown in FIG. 13, a different value is set as the threshold of the shadow point in accordance with the results of the highlight point judgment and the histogram balance judgment.

Then, if SDP≧Th_S2, the image is judged as a light image of which the low-brightness area is small. If Th_S1≦SDP<Th_S2, the image is judged as an image which is light as a whole although it includes the distribution of the low-brightness area. If SDP<Th_S1, the image is judged as a dark image which includes many distributions in the low-brightness area.

For example, on the histogram of the lightish image as shown in FIG. 14, SDP exceeds the threshold Th_S2 (SDP>Th_S2), whereby the image is judged as an image which does not include any distribution in the low-brightness area. In this case, as described above, on the histogram shown in FIG. 14, the distributions are entirely biased toward the higher-brightness side, whereby the shadow point SDP is resultingly located at the higher-brightness side. Furthermore, the fact that SDP is high means that the gradation level is narrow. In regard to the image of this type, it is necessary to perform the gamma correction or expand the brightness value toward the lower-brightness side to darken it.

On the histogram shown in FIG. 15, SDP is lower than the threshold Th_S2 and higher than the threshold Th_S1 (Th_S1<SDP≦Th_S2), whereby the image is judged as an image which is not so dark although it includes the certain measure of distributions in the low-brightness area. This is because the brightness roughly shows the intermediate distributions, and the shadow point SDP is located relatively at the lower-brightness side.

Next, on the histogram shown in FIG. 16, SDP is lower than the threshold Th_S1, whereby the image is judged as an image which includes many distributions in the low-brightness area. In this case, it is understood that the histogram is biased toward the lower-brightness side and thus the image is wholly a dark image.

(4) Determination of Correction Gradation Curve

As shown in FIG. 13, the processing-target image is divided into plural images according to the above three parameters of the detail of the distribution of the high-brightness area on the histogram (highlight point), the rate Slow (balance of histogram), and the detail of the distribution of the low-brightness area on the histogram (shadow point). Then, in a next step S124, the correction gradation curve is determined by using the table shown in FIG. 13.

As apparent from the correction table shown in FIG. 13, by the gradation curve according to the embodiment, the kind of image in question is judged in a comprehensive manner according to the three parameters. For example, if the highlight point is relatively low, the gradation curve to cut off the high-brightness area and thus expand the histogram toward the higher-brightness side is selected. Furthermore, in regard to the image for which the balance of the histogram is intended to be adjusted, the gradation curve to perform the gamma correction is selected. If the rate Slow (balance of histogram) is biased toward the lower-brightness side, the gradation curve including the process to lighten the entire image by correcting the gamma value or the like is selected. Furthermore, if the shadow point is relatively high, the gradation curve including the process to cut off the low-brightness area and thus expand the histogram toward the lower-brightness side is selected. In any case, the gradation curves concerning the classified plural images are determined by using the judgment table shown in FIG. 13.

For example, it is assumed that the highlight point HLP is high (i.e., 245), the rate Slow is 20%, and the shadow point SDP is relatively high (i.e., 60). In regard to such an image, the gradation curve to cut off the low-brightness area of 20 or less is selected.

In regard to the lightish image shown in FIG. 14, HLP is higher than the threshold Th_H2, Slow is 20%, and SDP is higher than the threshold Th_S2. Thus, according to the table shown in FIG. 13, this image is judged as a light image, and the gamma value is set to 1.1. By the determined gamma value, the correction to darken the image up to the relatively high-brightness area (i.e., to increase the print density) is performed, whereby the print image having the optimum density as a whole is obtained. Furthermore, since the rate of the pixels in the low-brightness area is low, it is possible to decrease the portion where the image is defaced.

Next, in regard to the image for which the balance of the histogram is intermediate as shown in FIG. 15, HLP is higher than Th_H1 and smaller than Th_H2, Slow is 40%, and SDP is higher than Th_S1 and smaller than Th_S2. Thus, according to the table shown in FIG. 13, the contrast of this image can be emphasized by using the correction gradation curve of S-curve, whereby it is possible to enhance the contrast of the entire image to be printed and thus obtain a sightly print image.

On one hand, in regard to the dark image as shown in FIG. 16, HLP is smaller than Th_H1, Slow is 60%, and SDP is smaller than Th_S1. Thus, according to the table shown in FIG. 13, the straight line to cut off the high-brightness area of 200 or more is selected, whereby it is possible to lighten the entire image to be printed. In particular, it is possible to expand the histogram of the image toward the higher-brightness side and thus obtain a contrasted-density well-balanced image.

In the above explanation, the lightness of the high-brightness area of the image is judged with three levels in (1) highlight point judgment. However, to obtain the further-optimum gradation curve, it is possible to further increase the number of levels of classification (e.g., four or more levels) for performing the detailed judgment. Furthermore, to perform more detailed judgment in (2) histogram balance judgment and (3) shadow point judgment, it is possible to increase the number of levels of classification.

(LUT Creation)

After the above gradation curve judgment process (step S112 in FIG. 11) ended, in a step S113 of FIG. 11, the LUT for the brightness correction is created based on the parameter for forming the gradation curve obtained in the gradation curve judgment process.

Figure 17:
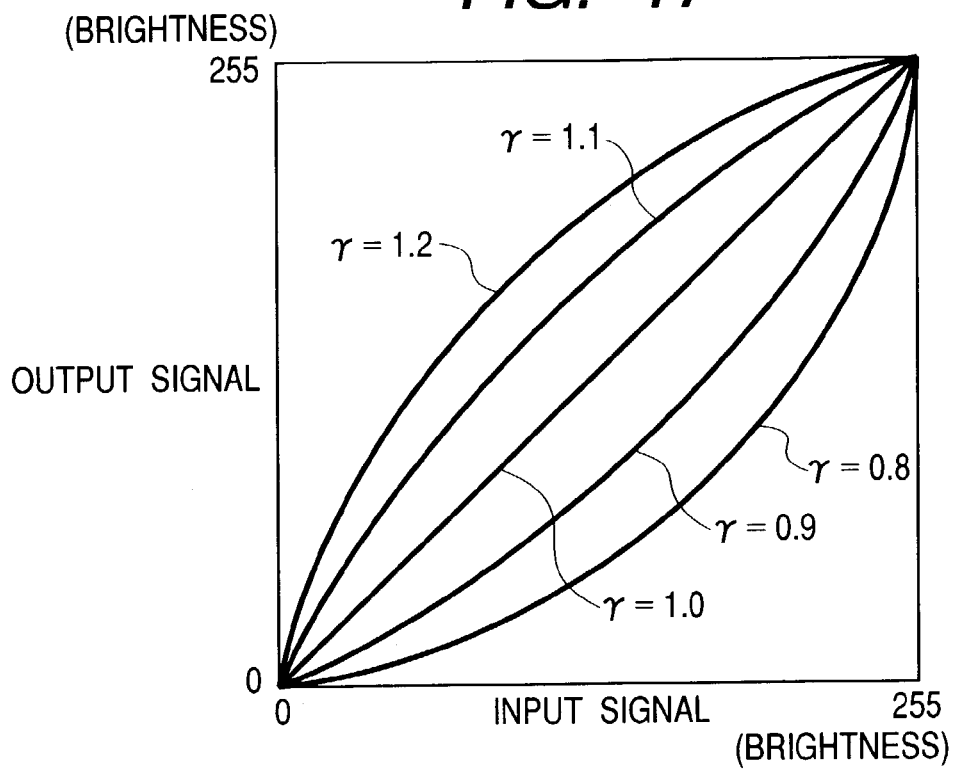
FIG. 17 is a diagram showing conversion characteristic curves (exponential functions) according to gamma values on a brightness correction table.
Figure 18:
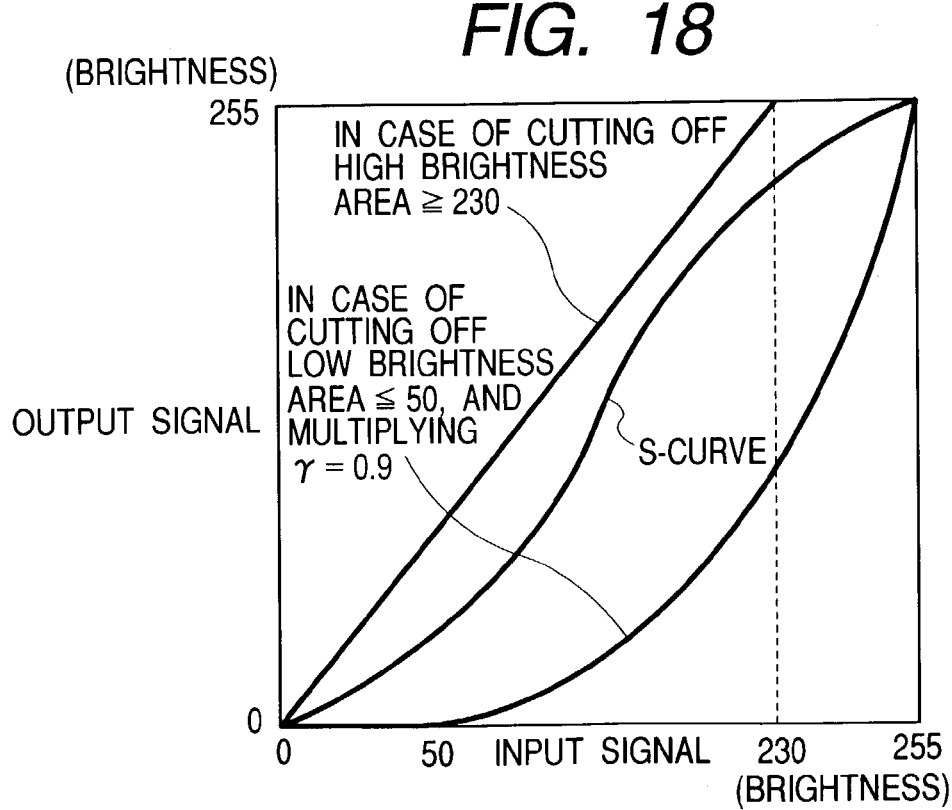
FIG. 18 is a diagram showing conversion characteristic curves (five-dimensional curves) on the brightness correction table, other than simple gamma correction.

On the LUT in the embodiment, the gradation curve obtained as above is recorded as an exponential function and a quintic function. That is, in case of simply performing only the gamma correction, the exponential function (FIG. 17) is used, while in case of performing the correction using the straight line for cutting off the high-brightness or low-brightness area and more complicated curves, the quintic curve (FIG. 18) is used.

That is, in case of using the exponential function for performing only the gamma correction, if it is assumed that an input brightness signal is Y and an output brightness signal is Y', an LUT L[Y] performs the conversion represented by the equation $Y'=255\times[(Y/255)1/y]$, whereby the gamma value is given based on the judgment result.

On the other hand, in case of using the quintic curve, the LUT performs the conversion represented by the equation $Y'=A+B\times Y+C\times Y^2+D\times Y^3+E\times Y^4+F\times Y^5$. In this case, by applying the coefficients A, B, C, D, E and F, the quintic curve completes. Here, it should be noted that the LUT is dynamically created, that is, the LUT is created in regard to each process for the processing-target image. By dynamically creating such a correction table as above, it is possible to reduce the necessary memory amount.

It is of course possible to statically prepare the LUT beforehand on the memory in regard to each gradation curve, instead of dynamically creating it.

(Correction)

Next, in a step S114 shown in FIG. 11, the brightness signal Y is corrected. That is, the brightness value Y of the input image is converted as Y'=L[Y] by the created LUT L[Y].

Furthermore, the brightness-corrected brightness signal Y' and the color difference signals Cr and Cb of the input image are returned to the R, G and B signals, and then the corrected R', G' and B' image signals are thus generated.

According to the embodiment, on the histogram, since the component value that the accumulated frequency from the maximum or minimum value represents the predetermined value is obtained within the range of the component value concerning the lightness of the image data, it is possible to know the entire lightness of the image. Furthermore, since the rate of the accumulated frequency from the minimum or maximum value up to the predetermined component value to the number of the total pixels on the histogram is obtained, it is possible to know the distributions of the lightness of the image. Then, the lightness distribution is judged based on the component value and the rate, and the gradation curve for the correction is obtained based on the judged result, whereby the correspondence of the lightness distribution and the correction gradation curve can be made different in regard to each entire lightness of the image.

That is, it is possible to finally select, from the plural correction gradation curves, one correction gradation curve optimum for the image in question by using the three parameters of the highlight point, the balance of the histogram, and the shadow point.

Thus, for example, in regard to the image which is entirely dark, it is possible to decrease the distribution showing the dark range by the distribution of the lightness corresponding to the correction to further lighten the image (i.e., the correction to further lower the density on the print image), whereby it is possible to obtain more preferable balance of the lightness on the print image. On the other hand, in regard to the image which is entirely light, it is possible to increase the density on the print image by darkening it. Thus, it is possible to compensate a density output characteristic of a print device that this device can essentially achieve only low-density printing, whereby it is possible by this print device to print an image of entirely high density. Furthermore, in regard to the image of which the dynamic range is essentially narrow, it is possible, by expanding this range, to enhance the contrast of the entire image to be printed and thus obtain a sightly print image.

It should be noted that, although the judgment is performed in the order shown in FIG. 12 in the embodiment, the order may be appropriately changed.

Furthermore, the highlight point HLP and the shadow point SDP need not necessarily be obtained by the above methods. That is, known methods may be appropriately used to obtain them.

Incidentally, as described above, the highlight point is used to check the lightness distribution in the high-brightness area and the shadow point is used to check the lightness distribution in the low-brightness area in the embodiment. However, for example, if the details of the lightness distribution in the high-brightness area can be checked by a parameter other than the highlight point, it is of course possible to use this parameter instead of the highlight point. That is, it is possible to obtain the rate of the accumulated frequency from the maximum value up to a certain brightness value (e.g., 220) to the number of the total pixels on the histogram and then judge the lightness distribution in the high-brightness area based on the obtained rate. In this case, as well as the highlight point, the plural thresholds are provided for that parameter to perform so-called classification judgment. Of course, in the low-brightness area, it is possible to obtain, instead of the shadow point, the rate of the accumulated frequency from the minimum value up to a certain brightness value (e.g., 30) to the number of the total pixels on the histogram and then judge the lightness distribution based on the obtained rate.

Furthermore, in the above embodiment, the correction concerning the brightness value Y is explained. On one hand, the same correction may be performed directly to the R, G and B signals. In this case, the above LUT can be used for the correction in the state that R, G and B are used instead of Y and R', G' and B' are used instead of Y'. Incidentally, since the RGB/YCrCb conversion is not necessary when the R, G and B signals are corrected, it is possible to increase the processing speed.

When exposure setting is in an automatic mode, the above process is automatically added. Here, for example, if the exposure setting is in the automatic mode and a change amount from the reference value is known, the above process may be modified according to the known amount.

That is, when the thresholds of HLP, S128 and SDP shown in FIG. 13 are set, the exposure value of the shooting condition data 106 is used. For example, if the exposure value is smaller than the reference value, the thresholds in FIG. 13 are changed so that the correction to entirely lighten the image can be easily performed, whereby it is possible to correct the darkly shot image to become appropriately light. On the other hand, if the exposure value is larger than the reference value, there is the fear that the image is overexposed, whereby it only has to change the thresholds in FIG. 13 so as to lower the lightness of the image as a whole.

(Digital Zoom ON/OFF Information)

Incidentally, the digital still camera in recent years can optically zoom in/out the subject and further perform a zoom (enlargement) process of the image through a digital process. Here, in the digital zoom, the image size is frequently multiplied simply by rational number, whereby a jaggy frequently appears at the contour portion of the zoomed image. Incidentally, a nearest neighbor method, a bi-linear interpolation method or a bi-cubic convolution method is generally used as the zoom method.

Figure 19:
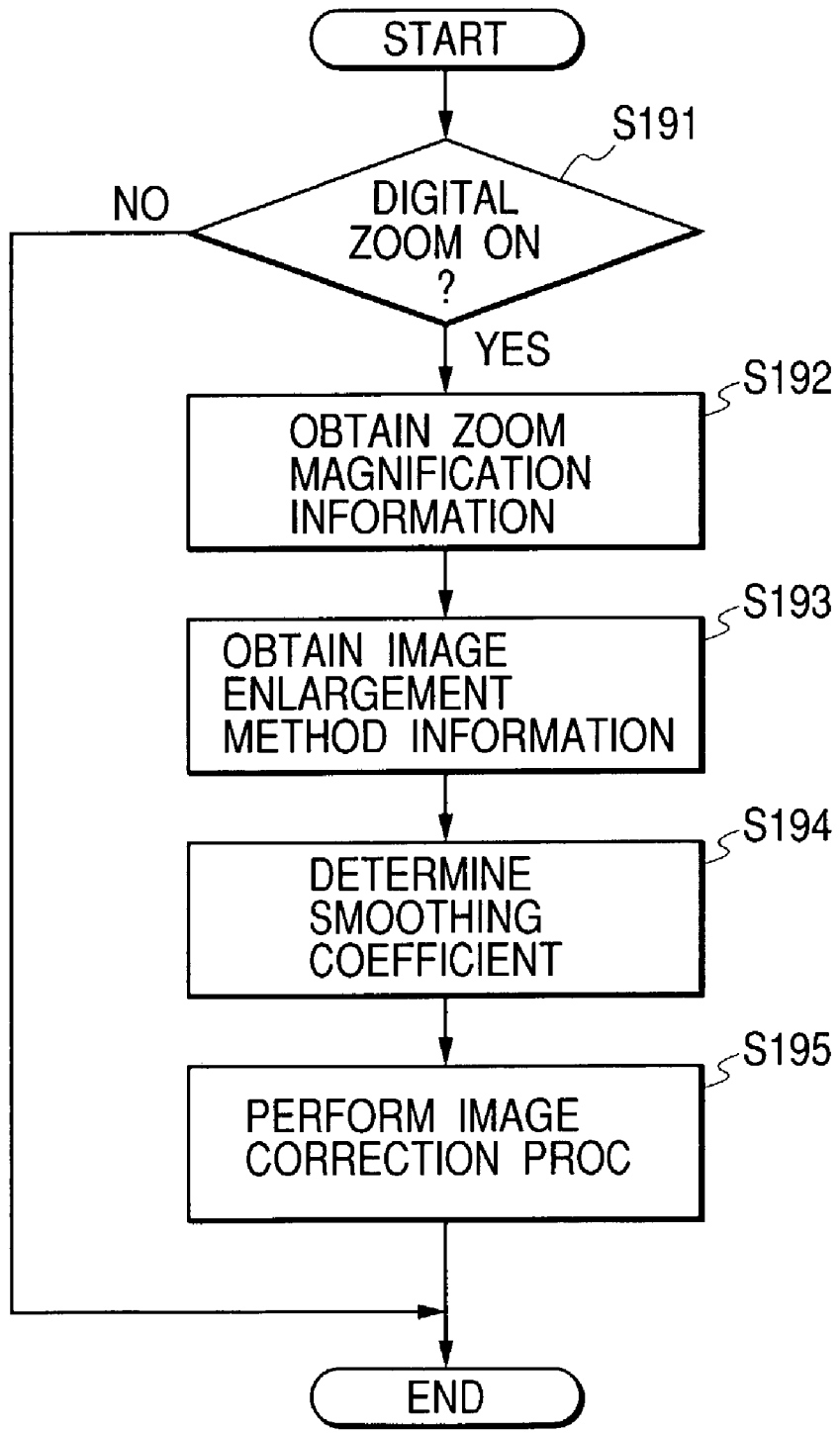
FIG. 19 is a flow chart showing a smoothing process to be performed based on digital zoom information.

If the magnifying power of the digital zoom, the zoom method and the like are written in the shooting condition data 106, a smoothing process may be performed based on the written information to smoothen the contour of the image. For example, as disclosed in Japanese Patent Application Laid-Open No. 11-33156, a method of performing a zoom (enlargement) process to a low-resolution image to set the image to have high resolution is known. On one hand, it is desirable to make a coefficient of such a smoothing process (i.e., level of process) variable according to the magnifying power of the digital zoom and the zoom processing method. That is, it is possible to lower the level of smoothing as the magnifying power of the digital zoom is low. On the contrary, in the nearest neighbor method for the zoom process, it is possible to increase the level of smoothing. Such a series of processes is shown in steps S191 to S195 of FIG. 19.

(Stroboscopic Light Emission ON/FF Information)

If the information representing that the stroboscope emitted light is obtained from the shooting condition data 106, as well as the above, the content of the density correction process can be changed. For example, in addition to the table shown in FIG. 13, another table for stroboscopic light emission can be added. In this case, the conventional table shown in FIG. 13 is used if the stroboscope is off, and the newly added table is used if the stroboscope is on, whereby it is possible to achieve a higher-precision image correction.

In the image shooting using the stroboscope, the entire image such as a night scene, a dark-room scene or the like tends to be shot darkly. Therefore, in this case, it is necessary to change the thresholds on the table so that the shot image is easy to be corrected lightly. Furthermore, the subject irradiated by the stroboscopic light tends to become pale. In this case, the correction to make the tint of the subject yellowish may be performed. On one hand, the stroboscopic light does not reach the background of the subject, whereby the shot image in this case tends to become entirely dark with the broken gradation. That is, it is necessary to increase the brightness of the low-gradation portion.

By performing the above processes, an optimum process can be performed to the image which has been shot with the stroboscopic light emission.

(Shot Scene Information)

It is assumed that the shot scene information is added to the shooting condition data 106 when a shooting mode (e.g., a scenery mode, a figure (person) mode, or a macro shooting mode) is changed according to the subject. In such a case, optimum memory color reproduction correction can be performed based on the shot scene information. For example, in the scenery mode, the sky and the plant may be the main subject, whereby it is possible in the step S2 of FIG. 3 to increase the saturation of blue and green so as to increase the contrast by the image correction processing unit. Furthermore, by performing a sharpness filter process, it is possible to improve the scenery image sightly. Incidentally, in case of increasing the saturation, a saturation expansion coefficient is obtained for each hue, and the former saturation value is multiplied by the obtained coefficient, whereby it is possible to effectively perform the saturation correction with a small-capacity memory.

On one hand, in the figure (person) mode, it is possible in the step S2 of FIG. 3 to add a process to correct the saturation and the brightness of a skin-color area more preferably by the image correction processing unit. Furthermore, a method of blurring or shading off the entire image by using a blur filter is one of the methods of bringing the figure image into fine view. Also, this method can be automatically achieved by using the shooting condition data.

In the above embodiment, the correction method to be executed in the case where the shooting condition data representing, e.g., white balance, exposure, stroboscope, shot scene, digital zoom or the like is read is explained. However, in this case, when the plural image correction processes are performed, there is the fear that the similar processes are performed redundantly, and there is the fear that the point which has been emphasized in the former process becomes weak through the succedent process.

For example, both the color balance correction process and the density correction process explained as above include the contrast emphasizing process using the highlight and shadow points. In such a case, the contrast process which is enough by one time is performed twice, whereby the image against user's intention is obtained.

Furthermore, it is assumed that the smoothing process is performed to the image in response to the digital zoom information when the shot scene (image) is obtained in the scenery mode. In this case, if the sharpness filter process is further performed to the image, the effect of the former smoothing process is spoiled.

To prevent such a problem occurred when the plural processes are performed to one image, a restriction is necessary to the process. In the embodiment, order of priority is set for each of the plural processes.

Figure 20:
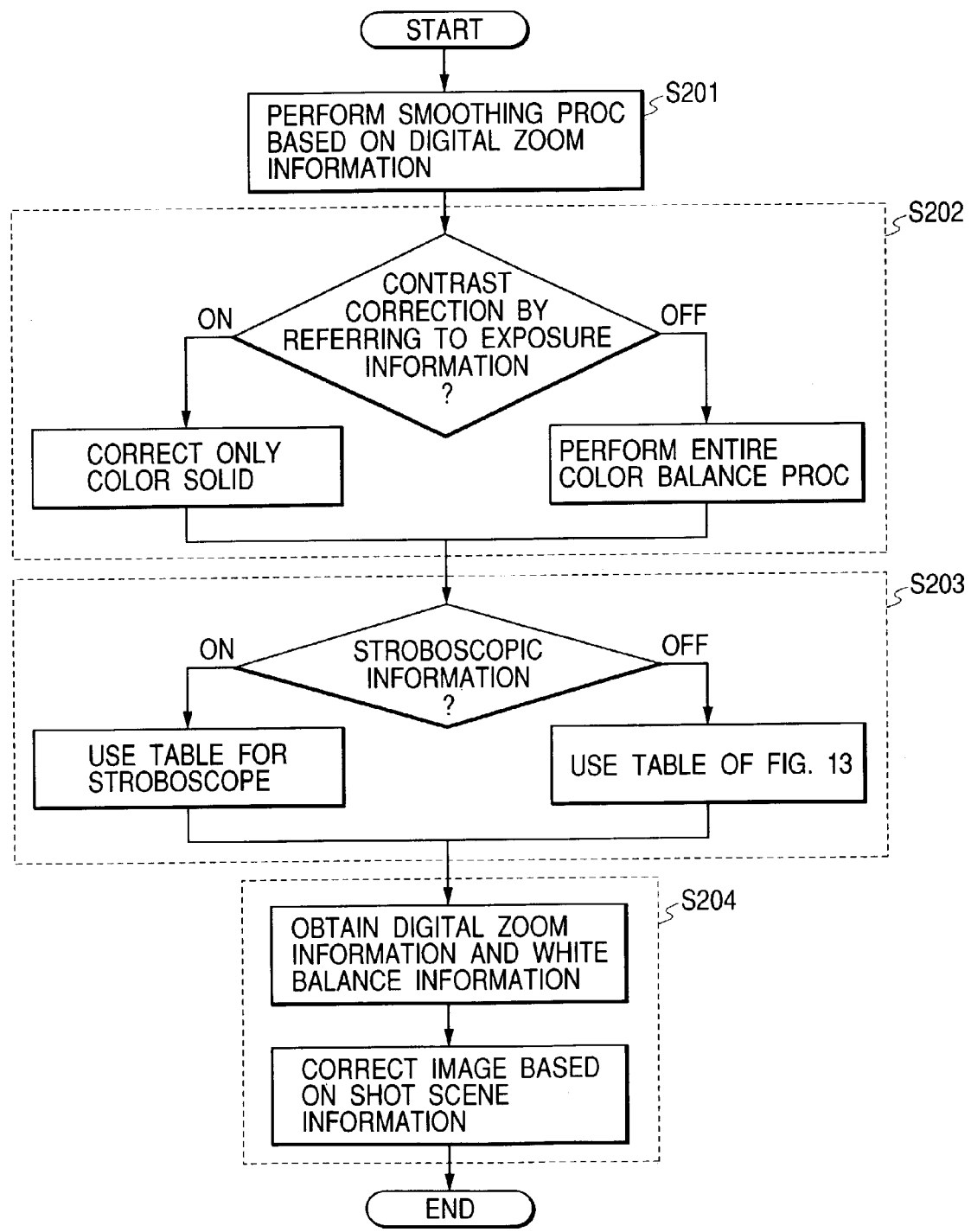
FIG. 20 is a flow chart showing restrictions in case of performing plural image correction processes based on shooting condition data.

First, as shown in FIG. 20, the judging information representing what kind of judgment is performed for each of the color balance information, the exposure information, the stroboscopic information, the shot scene information and the digital zoom information is stored in the memory.

Next, in a step S201, the smoothing process is performed in response to the digital zoom information so as to convert the low-resolution image into the high-resolution image. Since it is considered that the smoothing process does not affect the tint and lightness of the entire image, it is desirable to first perform this process.

Then, in a step S202, if it is judged that the contrast should be emphasized on the basis of the level of the lightness correction judged in response to the exposure information, the contrast correction in the color balance correction to be first performed is not performed (ON in the step S202). On the other hand, if it is judged that only the gamma correction should be performed in the lightness correction (i.e., the contrast emphasizing is not performed), the color balance correction including the contrast correction is performed (OFF in the step S202). By doing so, it is possible to prevent that the contrast correction is redundantly performed in both the lightness correction process and the color balance correction process.

Next, in a step S203, the lightness correction process is performed by referring to whether the stroboscopic information is ON or OFF. If the stroboscopic information is ON, the lightness correction table refers to the table for the stroboscope, while if the stroboscopic information is OFF, the lightness correction table refers to the convention table shown in FIG. 13. By doing so, the optimum lightness correction process obtained from the exposure information and the stroboscopic information can be performed to the image.

Finally, in a step S204, the memory color reproduction correction process is performed in response to the shot scene information. In this process, if the saturation is adjusted in the color balance correction, the saturation expansion coefficient can be set small according to the adjusted saturation. Furthermore, if the level of the smoothing is high in the digital zoom correction, the level of blurring should be set small in the figure (person) mode.

As described above, when the plural image correction processes are performed, the order of priority is set for each of the plural processes, each of the plural processes is weighted according to the various conditions, and the restriction that, if one correction process is performed, other process is not performed is set, whereby the unforced and effective image correction can be achieved.

(Other Embodiment)

In the above embodiment, the shooting condition information is displayed on the UI screen. However, the present invention is not limited to this. For example, it is possible to display by turning on/off a predetermined lamp that the shooting condition information is correctly recognized and used.

Furthermore, various modifications can be achieved within the scope not depart from the concept of the present invention.

Moreover, the digital still camera is used as the input means (obtaining means) of the image by way of example, but the present invention is not limited to this. For example, the present invention is applicable to various input devices such as a digital video camera, an image scanner, a film scanner and the like.

Moreover, it is needless to say that the first and second processing methods can be achieved in a case where a storage medium storing program codes of software to achieve the functions of the host computer and the terminal device executing the first and second processing methods is supplied to a system or an apparatus, and then a computer (or CPU or MPU) in the system or the apparatus reads and executes the program codes stored in the storage medium.

In this case, the program codes themselves read from the storage medium achieve the functions of the host computer and the terminal device executing the first and second processing methods, whereby the storage medium storing the program codes and the program codes themselves constitute the present invention.

As the medium such as the storage medium for supplying the program codes, for example, a ROM, a flexible disk, a hard disk, an optical disk, a magnetooptical disk, a CD-ROM, a CD-R, a magnetic tape, a non-volatile memory card, or the like can be used.

Furthermore, it is needless to say that the present invention includes not only a case where the functions of the first and second methods are achieved by executing the program codes read by the computer, but also a case where an OS or the like functioning on the computer executes all the process or a part thereof according to the instructions of the program codes, thereby achieving the functions of the first and second methods.

Moreover, it is needless to say that the present invention includes a case where the program codes read from the medium such as the storage medium are once written in a memory provided in a function expansion board inserted in the computer or a function expansion unit connected to the computer, then a CPU or the like provided in the function expansion board or the function expansion unit executes all the process or a part thereof according to the instructions of the written program codes, thereby achieving the functions of the first and second embodiments.

Figure 21:
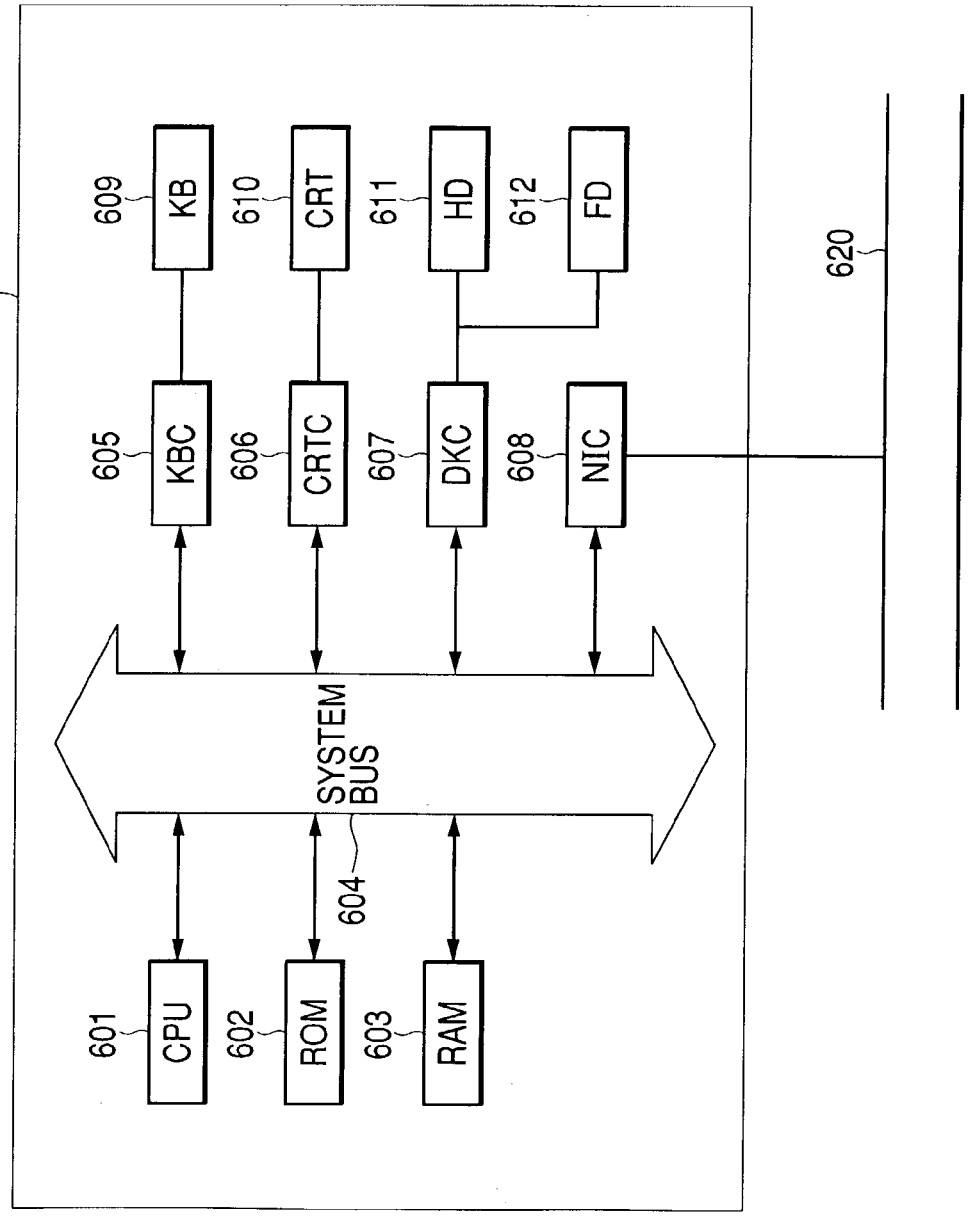
FIG. 21 is a block diagram showing functions of a computer.

FIG. 21 is a block diagram showing a function 600 of the above computer.

In the computer function 600, as shown in FIG. 21, a CPU 601, a ROM 602, a RAM 603, a keyboard controller (KBC) 605 for a keyboard (KB) 609, a CRT controller (CRTC) 606 for a CRT display (CRT) 610 functioning as the display unit, a disk controller (DKC) 607 for a hard disk (HD) 611 and a flexible disk (FD) 612, and a network interface controller (NIC) 608 for connection with a network 620 are wholly connected together so that these structural components can mutually communicate with others through a system bus 604.

The CPU 601 wholly controls each structural component connected to the system bus 604, by executing the software stored in the ROM 602 or the HD 611 or executing the software supplied from the FD 612.

That is, the CPU 601 performs the control to achieve the operations in the embodiment by reading the processing program according to a predetermined processing sequence from the ROM 602, the HD 611 or the FD 612 and executing the read program.

The ROM 603 functions as a main memory or a working area and the like of the CPU 601.

The KBC 605 controls the instruction input from the KB 609, a not-shown pointing device and the like.

The CRTC 606 controls the display by the CRT 610.

The DKC 607 controls the access to the HD 611 and the FD 612 which store a boot program, various application programs, editing files, user files, network administration programs, the predetermined processing programs in the embodiment, and the like.

The NIC 608 bi-directionally exchanges the data with the devices on the network 620 or the system.

As explained above, according to the present invention, the condition information (shooting condition information, etc.) added to the image information (image information obtained in the shooting by the digital still camera, etc.) of the processing-target image is analyzed, and the image process (image correction process, etc.) is performed to the image information on the basis of the result of the analysis, whereby it is possible to perform the image process according to the condition at the time of obtaining the processing-target image. Thus, it is possible to provide the excellent processed image intended by the user.

For example, in the digital still camera, the color balance correction is performed in response to the white balance information, and the lightness correction is performed in response to the exposure information. Furthermore, the lightness correction is performed by using the correction table according to the ON/OFF of stroboscopic light emission, and the smoothing process is performed to the image in response to the digital zoom information. Moreover, the memory color reproduction process according to, e.g., the scenery mode or the figure (person) mode is performed in response to the shot scene information. By doing so, as compared with the conventional correction method in which the histogram is analyzed merely based on the image data, it is possible to perform the optimum image correction based on the more detailed information.

Furthermore, in the case where the plural processes are performed, in order to prevent the problems that the similar processes are performed redundantly and the point which has been emphasized in the former process becomes weak through the succedent process, the order of priority is set respectively to the plural processes, and the plural processes are respectively weighted according to the various conditions, whereby the unforced and effective image correction can be achieved.

As above, the high-precision automatic image correction can be achieved in response to the information representing the conditions at the time when the image information is obtained, whereby it is possible to provide the high-quality processed image in which the user's intention at the time of image shooting can be more sufficiently reflected.

As many apparently and widely different embodiments of the present invention can be made without departing from the spirit and scope thereof, it is to be understood that the invention is not limited to the specific embodiments thereof expect as defined in the appended claims.

What is claimed is:

1. An image processing apparatus which performs an image process to image information including condition information representing a condition at a time when an image is obtained, comprising:
    analysis means for analyzing the condition information; and
    processing determination means for obtaining a color correction amount of the image according to a value representing a level of color balance, a lightness correction amount of the image according to a value representing a level of lightness and a smoothing correction amount of the image according to a value concerning zoom, on the basis of an analysis result of said analysis means.

2. An image processing apparatus according to claim 1, further comprising output means for outputting the image information which has been processed by said processing means.

3. An image processing apparatus according to claim 2, wherein said output means includes a print output function.

4. An image processing apparatus according to claim 1, wherein
    in the process to obtain the color correction amount of the image, lightness of a highlight point of an original image and lightness of a shadow point thereof are detected, and colors of the highlight point and the shadow point are obtained from plural pixels having said lightness, and
    the color correction process is performed to the original image based on the highlight point, the shadow point and the colors of these points.

5. An image processing apparatus according to claim 4, wherein, in the color correction process, a color solid axis of the original image is conformed to an axis indicating the lightness, and contrast adjustment is performed to color components representing the lightness of the original image.

6. An image processing apparatus according to claim 4, wherein, in the color correction process, the correction process is performed to color components representing the color of the original image, thereby adjusting saturation of the original image.

7. An image processing apparatus according to claim 4, wherein a histogram is created based on color components representing the lightness of the original image, and
    the highlight point and the shadow point are detected based on said histogram.

8. An image processing apparatus according to claim 1, wherein said processing determination means for obtaining the lightness correction amount of the image judges a distribution of the lightness of the image from a histogram concerning the number of pixels of values of components concerning the lightness of the image represented by image data, automatically selects one of plural gradation correction conditions based on a judged distribution, and corrects the components concerning the lightness by using the selected gradation correction condition.

9. An image processing apparatus according to claim 8, wherein the distribution of the lightness of the image is judged based on an accumulated frequency in a predetermined range of the histogram.

10. An image processing apparatus according to claim 9, wherein the distribution of the lightness of the image is judged based on a rate of the accumulated frequency in said predetermined range to the number of total pixels of the histogram.

11. An image processing apparatus according to claim 8, wherein the gradation correction condition is selected based on a combination of highlight and shadow points of the image and the distribution of the lightness of the image.

12. An image processing apparatus according to claim 8, wherein a density is increased if a rate of a highlight range on the histogram is high, the density is decreased if a rate of a shadow range on the histogram is low, and a dynamic range is expanded if a histogram width is narrow.

13. An image processing apparatus according to claim 12, wherein
    in a case where the rate of the highlight range is high, a level of increase of the density is made higher as compared with a case where the rate of the highlight range is low,
    in a case where the rate of the shadow range is high, a level of decrease of the density is made higher as compared with a case where the rate of the shadow range is low, and in a case where the histogram width is small, a level of expansion of the dynamic range is made higher as compared with a case where the histogram width is large.

14. An image processing apparatus according to claim 1, wherein the image information includes image information obtained by a digital still camera.

15. An image processing apparatus according to claim 1, wherein
the image information includes shot image information, and
the condition information includes at least any of exposure information, stroboscopic information, white balance information, shooting mode information and digital zoom information at a time when the shot image information is obtained.

16. An image processing apparatus according to claim 1, further comprising presentation means for presenting information concerning the condition information.

17. An image processing apparatus according to claim 16, wherein said presentation means presents the information concerning the condition information based on processing timing of the image information to which the condition information has been added.

18. An image processing apparatus according to claim 1, wherein said analysis means includes a function to analyze the image information.

19. An image processing apparatus according to claim 1, wherein, when said processing determination means obtains the plural kinds of image information and performs the plural processes corresponding to the obtained plural kinds of image information, said processing determination means sets order of priority for each of the plural processes.

20. An apparatus-implemented image processing method which performs an image process to image information including condition information representing a condition at a time when an image is obtained, comprising:

an analysis step of analyzing the condition information; and a processing determination step of obtaining a color correction amount of the image according to a value representing a level of color balance, a lightness correction amount of the image according to a value representing a level of lightness and a smoothing correction amount of the image according to a value concerning zoom, on the basis of an analysis result in said analysis step.

* * * * *

UNITED STATES PATENT AND TRADEMARK OFFICE
CERTIFICATE OF CORRECTION

PATENT NO. : 7,242,800 B2
APPLICATION NO. : 10/386606
DATED : July 10, 2007
INVENTOR(S) : Iguchi et al.

It is certified that error appears in the above-identified patent and that said Letters Patent is hereby corrected as shown below:

COLUMN 1:
Line 35, "enabling" should be deleted.
Line 36, "and" should be deleted.

COLUMN 2:
Line 43, "against" should read --against the--.
Line 61, "take" should read --take into--.

COLUMN 4:
Line 54, "which" should read --which the--.

COLUMN 6:
Line 20, "achieved" should read --achieved by--.
Line 44, "the" (first occurrence) should be deleted.
Line 67, "effective" should read --effectively--.

COLUMN 8:
Line 40, "though to have" should read --through having--.

COLUMN 9:
Line 36, "histogram" should read --histogram is--.
Line 50, "obtained;" should read --obtained.--.
Line 67, "black" should read --white--.

COLUMN 11:
Line 46, "that" should read --at which--.

COLUMN 12:
Line 4, "most" should be deleted.
Line 37, "LUT's" should read --LUTs--.

COLUMN 13:
Line 28, "a less" should read --less--.

COLUMN 14:
Line 15, "occur" should read --occurs--.
Line 51, "solid" should read --solid axis--.
Line 65, "solid" should read --solid axis--.

UNITED STATES PATENT AND TRADEMARK OFFICE
CERTIFICATE OF CORRECTION

PATENT NO.       : 7,242,800 B2
APPLICATION NO.  : 10/386606
DATED            : July 10, 2007
INVENTOR(S)      : Iguchi et al.

It is certified that error appears in the above-identified patent and that said Letters Patent is hereby corrected as shown below:

COLUMN 15:
Line 25, "two" should be deleted.
Line 39, "one" should read --the other--.

COLUMN 16:
Line 13, "form" should read --from--.

COLUMN 17:
Line 58, "process" (first occurrence) should read --processes--.

COLUMN 18:
Line 23, "value" should read --values--.

COLUMN 21:
Line 21, "further-" should read --further--.
Line 30, "FIG. 11)" should read --FIG. 11) is--.
Line 46, "Y'=255x[Y/255)1/y," should read --Y'=255x[(Y/255)1/γ],--.

COLUMN 23:
Line 33, "jaggy" should read --jaggy edge--.
Line 55, "ON/FF" should read --ON/OFF--.

COLUMN 24:
Line 37, "shading off" should read --shading of--.
Line 55, "against" should read --against the--.
Line 62, "occurred" should read --from occurring--.

COLUMN 25:
Line 28, "convention" should read --conventional--.
Line 57, "scope not depart" should read --scope without departing--.

UNITED STATES PATENT AND TRADEMARK OFFICE
CERTIFICATE OF CORRECTION

PATENT NO. : 7,242,800 B2
APPLICATION NO. : 10/386606
DATED : July 10, 2007
INVENTOR(S) : Iguchi et al.

It is certified that error appears in the above-identified patent and that said Letters Patent is hereby corrected as shown below:

COLUMN 26:
Line 14, "magnetooptical" should read --magneto-optical--.
Line 21, "process" should read --processes--.

Signed and Sealed this

Seventeenth Day of February, 2009

JOHN DOLL
*Acting Director of the United States Patent and Trademark Office*